United States Patent
Levitsky et al.

(10) Patent No.: US 11,641,642 B2
(45) Date of Patent: May 2, 2023

(54) UE BEAM RESELECTION PROCEDURE WITH CSI REPORTING AND BEAM SWITCH INDICATION

(71) Applicant: QUALCOMM Incorporated, San Diego, CA (US)

(72) Inventors: Michael Levitsky, Rehovot (IL); Raghu Narayan Challa, San Diego, CA (US); Ruhua He, San Diego, CA (US); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/149,556

(22) Filed: Jan. 14, 2021

(65) Prior Publication Data

US 2022/0225312 A1    Jul. 14, 2022

(51) Int. Cl.
*H04W 72/04*    (2009.01)
*H04W 72/044*    (2023.01)
(Continued)

(52) U.S. Cl.
CPC ......... *H04W 72/046* (2013.01); *H04L 5/0057* (2013.01); *H04W 24/10* (2013.01)

(58) Field of Classification Search
CPC .... H04W 72/046; H04W 24/10; H04L 5/0057
See application file for complete search history.

(56) References Cited

U.S. PATENT DOCUMENTS 8,493,126 B2    7/2013    Sankaranarayanan et al.
10,893,431 B2 *  1/2021   Liou ................... H04W 16/28
(Continued)

FOREIGN PATENT DOCUMENTS

WO    WO-2022026174 A1 *    2/2022

OTHER PUBLICATIONS

Ericsson: "RS for Beam Management", 3GPP Draft, R1-1612346, 3GPP TSG-RAN WG1 #87, RS for Beam Management, 3rd Generation Partnership Project (3GPP), Mobile Competence Centre, 650, Route Des Lucioles, F-06921, Sophia-Antipoiis Cedex, France, vol. RAN WG1, No. Reno, Nevada, Nov. 14, 2016-Nov. 18, 2016, Nov. 5, 2016 (Nov. 5, 2016), XP051190406, 4 Pages, Nov. 5, 2016, 1,2, Retrieved from the Internet: URL: http://www.3gpp.org/ftp/tsg_ran/WG1_RL1/TSGR1_87/Docs/ [retrieved on Nov. 5, 2016] the whole document.

(Continued)

*Primary Examiner* — Deepa Belur
(74) *Attorney, Agent, or Firm* — The Marbury Law Group

(57) ABSTRACT

In embodiments, a base station may send to a user equipment (UE) a P3 beam management (BM) channel state information reference signal (CSI-RS) having two ports, and may receive from the UE a P3 BM report in response. The P3 BM report may include a proactive UE beam switch indication and a CSF report corresponding to the best UE beam determined by a UE based on the P3 BM CSI-RS. The base station may determine whether the P3 BM report includes an indication that the UE will perform a beam switch from a first UE beam to a second UE beam, and may determine a UE beam switch slot during which the UE will perform the beam switch. Starting at the beam switch slot, the base station may send a physical downlink shared data channel (PDSCH) transmission to the UE using the adjusted downlink transmission parameters.

26 Claims, 13 Drawing Sheets

(51) Int. Cl.
*H04L 5/00* (2006.01)
*H04W 24/10* (2009.01)

(56) References Cited

U.S. PATENT DOCUMENTS

| | | | |
|---|---|---|---|
| 11,350,291 B2* | 5/2022 | Kakishima | H04L 5/0048 |
| 2017/0019140 A1 | 1/2017 | Nick et al. | |
| 2018/0063835 A1* | 3/2018 | Abedini | H04B 7/0408 |
| 2018/0269947 A1 | 9/2018 | Levitsky et al. | |
| 2019/0149211 A1* | 5/2019 | Nilsson | H04B 7/0408 |
| | | | 375/267 |
| 2019/0239135 A1* | 8/2019 | Levitsky | H04L 5/0057 |
| 2020/0128523 A1* | 4/2020 | Chen | H04B 7/0626 |
| 2020/0205116 A1* | 6/2020 | Zhang | H04W 72/0446 |
| 2020/0228189 A1* | 7/2020 | Tang | H04W 36/36 |
| 2021/0282029 A1* | 9/2021 | Matsumura | H04W 72/046 |

OTHER PUBLICATIONS

International Search Report and Written Opinion—PCT/US2021/064543—ISA/EPO—dated Apr. 4, 2022; 21 pages.

\* cited by examiner

UE BEAM RESELECTION PROCEDURE WITH CSI REPORTING AND BEAM SWITCH INDICATION

BACKGROUND

In Long Term Evolution (LTE) Fifth Generation (5G) New Radio (NR) and other communication systems utilize millimeter wave (mmWave) frequency bands to provide high bandwidth communication links mmWave frequency bands are susceptible to free-space pathloss and atmospheric absorption. To mitigate these issues, 5G NR mmWave communication systems utilize beamforming techniques to generate highly directional signals, referred to as beams. A transmitting device and a receiving device each tune their respective antenna arrays to form a directional beam.

Currently, beam selection, beam reselection, and beam tracking procedures are performed autonomously by a wireless device, referred to herein as a user equipment (UE). A base station serving the UE does not receive any information about such UE behaviors or their timing. When the UE performs a beam switch, a physical channel and its characteristics and capacity change, and some transmit parameters used by the base station and the UE may no longer be optimal and may not be consistent with a new channel obtained after the UE beam switch for a period of time until updated channel state information (CSI) is available, causing a link transient that may degrade communication link performance.

SUMMARY

Various aspects include systems and methods performed by a base station and a UE for synchronizing or coordinating UE beam switching between a UE and a BS in order to mitigate a potential link transient that may follow a UE beam switching event. The base station may send P3 BM CSI-RS resources using two antenna ports. In some embodiments, each antenna port may be associated with a dedicated polarization or a dedicated antenna/antenna panel. The UE may receive the P3 BM CSI-RS and may evaluate a first UE beam and a second UE beam (or additional candidate UE beams) based on the P3 BM CSI-RS. The UE may evaluate a spectral efficiency (SPEF) associated with the first UE beam and a SPEF associated with the second UE beam based on the P3 BM CSI-RS resource (which has at least two repetitions of the CSI-RS resource on different orthogonal frequency division multiplexing (OFDM) symbols). The UE may determine whether to perform a UE beam switch from the first UE beam to the second UE beam based on the evaluation of the first UE beam and the second UE beam. The UE may determine whether to perform the UE beam switch from the first UE beam to the second UE beam based on the evaluation of a SPEF metric corresponding to the first UE beam and a SPEF metric corresponding to the second UE beam. The UE will select one of the evaluated UE beams that is associated with the highest SPEF metric as the serving UE beam and the UE will decide to perform a beam switch to the selected UE beam accordingly.

Various aspects performed by a base station may include transmitting to a UE a P3 beam management (BM) channel state information reference signal (CSI-RS) over a serving base station beam, receiving from the UE a P3 BM report for the serving base station beam in response to the P3 BM CSI-RS, determining whether the P3 BM report includes an indication that the UE will perform a UE serving beam switch from a first UE beam to a second UE beam, determining a UE beam switch slot during which the UE will perform the beam switch in response to determining that the P3 BM report includes an indication that the UE will perform the UE serving beam switch from the first UE beam to a second UE beam, determining adjusted downlink transmission parameters based on channel state feedback (CSF) included in the P3 BM report, and starting at the UE beam switch slot, sending a physical downlink shared data channel (PDSCH) transmission to the UE using the adjusted downlink transmission parameters.

In some aspects, the CSF included in the P3 BM report may provide information about a channel associated with a beam pair of the serving base station beam and the second UE beam. In such aspects, sending a signal to the UE using the adjusted downlink transmission parameters may include sending a signal to the UE using the adjusted downlink transmission parameters over the channel associated with the beam pair of the serving base station beam and the second UE beam. In some aspects, the indication that the UE will perform a beam switch from a first UE beam to a second UE beam may include a single bit indication. In some aspects, transmitting to the UE the P3 BM CSI-RS may include transmitting the P3 BM CSI-RS using two antenna ports.

Some aspects may include sending information to the UE scheduling a P3 beam management procedure based at least on two repetitions of a P3 BM CSI-RS resource transmitted on at least two OFDM symbols of a slot. In such aspects, a repetition of the P3 BM CSI-RS resource may be transmitted on a first OFDM symbol and the second repetition of the P3 BM CSI-RS resource may be transmitted on a second OFDM symbol.

In some aspects, the first OFDM symbol may enable the UE to evaluate the first UE beam, and the second OFDM symbol may enable the UE to evaluate the second UE beam. Some aspects may include transmitting to the UE information scheduling an aperiodic sounding reference signal (SRS) during the UE beam switch slot or during a next-available uplink slot, receiving the aperiodic SRS from the UE, and transmitting to the UE adjusted parameters for uplink data transmissions by the UE over the second UE beam after the UE beam switch based on the aperiodic SRS. Such aspects may include avoiding scheduling uplink data transmissions by the UE starting at the UE beam switch slot until after transmitting the adjusted parameters for uplink data transmissions from the UE. Such aspects may include transmitting to the UE information scheduling uplink data transmission opportunities for the UE using the second UE beam after the UE beam switch with an increased modulation and coding scheme (MCS) back off until a nearest opportunity to adjust uplink transmission parameters after the UE beam switch based on the SRS.

Some aspects may include transmitting to the UE information scheduling an aperiodic tracking reference signal (TRS) during the UE beam switch slot or during a next-available downlink slot to enable the UE to refine an estimation of channel characteristics of the channel associated with the serving beam obtained after the UE beam switch, and transmitting to the UE the aperiodic TRS according to the scheduling information.

In some aspects, determining a UE beam switch slot during which the UE will perform the beam switch in response to determining that the P3 BM report includes an indication that the UE will perform the UE serving beam switch from the first UE beam to a second UE beam may include determining the UE beam switch slot based on a slot in which the base station receives the P3 BM report with the indication that the UE will perform a beam switch plus a relative slot offset. Some aspects may include determining adjusted downlink transmission parameters for a channel associated with a beam pair of the serving base station beam and the first UE beam and based on the CSF included in P3 BM report in response to determining that the P3 BM report does not include an indication that the UE will perform the UE serving beam switch from the first UE beam to a second UE beam, and starting on a nearest downlink transmission occasion, sending a signal to the UE using the adjusting downlink transmission parameters.

Various aspects performed by a UE may include receiving from a base station a P3 beam management (BM) channel state information reference signal (CSI-RS) over a serving base station beam, evaluating a first UE beam and a second UE beam based on the P3 BM CSI-RS, determining whether to perform a UE beam switch from the first UE beam to the second UE beam based on the evaluation of the first UE beam and the second UE beam. In various aspects, the UE sends to the base station a P3 BM report that is based on an evaluation of the P3 BM CSI-RS. The P3 BM report includes a channel state information feedback (CSF) report corresponding to a beam that the UE selects based on the P3 BM CSI-RS. The P3 BM report also includes an indication of whether the UE will perform a UE beam switch from the first UE beam to the second UE beam. In some embodiments, in response to determining to perform the UE beam switch from the first UE beam to the second UE beam, the UE may send to the base station a P3 BM report that is based on the evaluation of the P3 BM CSI-RS for the second UE beam. In this case, the P3 BM report may also include a channel state information feedback (CSF) report corresponding to the UE beam that the UE has selected based on the P3 BM CSI-RS and a proactive indication of whether the UE will perform a UE beam switch from the first UE beam to the second UE beam. The UE may perform the beam switch from the first UE beam to the second UE beam during a UE beam switch slot. The UE may thereafter receive from the base station information scheduling a PDSCH allocation that includes adjusted PDSCH parameters based on the CSF report included in P3 BM report (e.g., PDSCH configuration information to assist the UE in performing demodulation and decoding).

In some aspects, the indication that the UE will perform the UE beam switch from a first UE beam to a second UE beam may include a single bit indication. In some aspects, receiving from the base station the P3 BM CSI-RS may include receiving from the base station P3 BM CSI-RS resource repetitions, wherein each P3 BM CSI-RS resource repetition is configured with two ports. In some aspects, evaluating a first UE beam and a second UE beam based on the P3 BM CSI-RS may include evaluating a spectral efficiency associated with the first UE beam and a spectral efficiency associated with the second UE beam based on the P3 BM CSI-RS resource repetitions. In some aspects, determining whether to perform a UE beam switch from the first UE beam to the second UE beam based on the evaluation of the first UE beam and the second UE beam may include determining that the measured spectral efficiency corresponding to the second UE beam is higher than the measured spectral efficiency corresponding to the first UE beam.

Some aspects may include receiving information from the base station scheduling a P3 beam management procedure based at least on two repetitions of a P3 BM CSI-RS resource transmitted on a first orthogonal frequency division multiplexing (OFDM) symbol and a second OFDM symbol. In such aspects, evaluating a first UE beam and a second UE beam based on the P3 BM CSI-RS may include evaluating the first UE beam using the first OFDM symbol, and evaluating the second UE beam using the second OFDM symbol. In such aspects, determining whether to perform a UE beam switch from the first UE beam to the second UE beam based on the evaluation of the first UE beam and the second UE beam may include determining whether to perform a beam switch from the first UE beam to the second UE beam based on the evaluation of the first UE beam using the first OFDM symbol and second UE beam using the second OFDM symbol.

Some aspects may include receiving from the base station data that is multiplexed with P3 BM CSI-RS resource on the first OFDM symbol. Some aspects may include sending to the base station a P3 BM report that includes a CSF report evaluated based on the P3 BM CSI-RS for a channel associated with the first UE beam in response to determining not to perform the UE beam switch from the first UE beam to the second UE beam. Some aspects may include sending to the base station a P3 BM report that includes a CSF report evaluated based on the P3 BM CSI-RS for a channel associated with the second UE beam in response to determining to perform the UE beam switch from the first UE beam to the second UE beam.

Further aspects include a UE having a processor configured to perform one or more operations of any of the methods summarized above. Further aspects include processing devices for use in a UE configured with processor-executable instructions to perform operations of any of the methods summarized above. Further aspects include a non-transitory processor-readable storage medium having stored thereon processor-executable instructions configured to cause a processor of a UE to perform operations of any of the methods summarized above. Further aspects include a UE having means for performing functions of any of the methods summarized above. Further aspects include a system on chip for use in a UE and that includes a processor configured to perform one or more operations of any of the methods summarized above.

DETAILED DESCRIPTION

Figure 1:
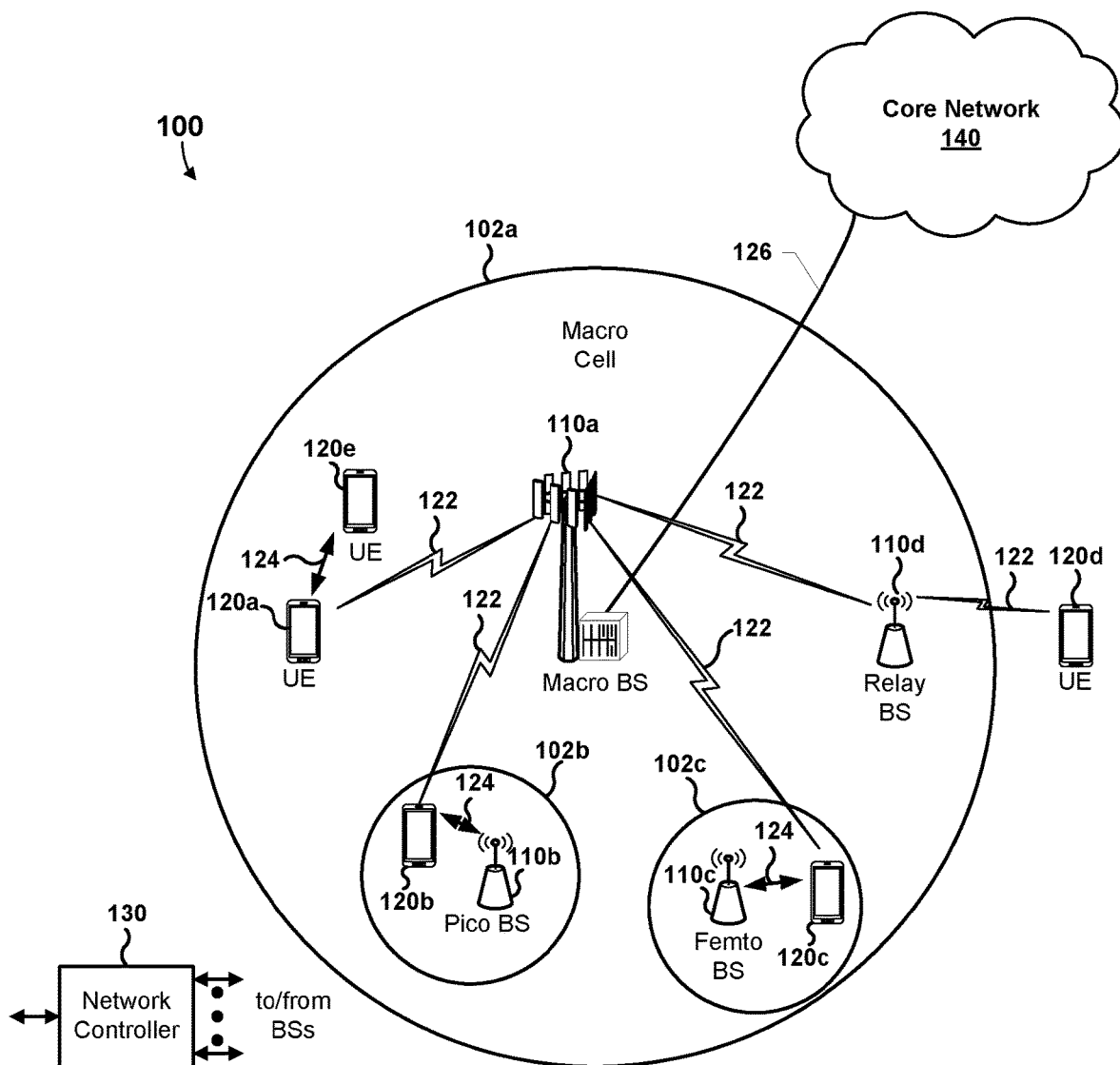
FIG. 1 is a system block diagram illustrating an example communications system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include systems and methods for UE beam reselection and UE beam switch synchronization that improve communication between a UE and a base station serving (i.e., in communication with) the UE by mitigating a potential link transient arising from a beam switch performed by the UE. In various embodiments, the base station may transmit to the UE a P3 (beam management procedure 3) beam management (BM) channel state information reference signal (CSI-RS) over a serving base station beam. The base station may send P3 BM CSI-RS resources using two antenna ports. The UE may receive the P3 BM CSI-RS and may evaluate a first UE beam and a second UE beam based on the P3 BM CSI-RS. The UE may determine whether to perform a UE beam switch from the first UE beam to the second UE beam based on the evaluation of the first UE beam and the second UE beam. In various embodiments, the UE may evaluate a spectral efficiency (SPEF) associated with the first UE beam and a SPEF associated with the second UE beam based on the P3 BM CSI-RS resource repetitions. In some embodiments, the UE may determine whether to perform the UE beam switch from the first UE beam to the second UE beam based on the evaluation of a SPEF metric corresponding to the first UE beam and a SPEF metric corresponding to the second UE beam. In some embodiments, evaluating the first UE beam and the second UE beam may include comparing the SPEF metrics of the first and second UE beams. In some embodiments, the UE may select a UE beam based on certain SPEF metric maximization criteria. In various embodiments, evaluating the SPEF metrics may include receiving CSI-RS resources that have been transmitted by the base station using two antenna ports. In such embodiments, transmitting the CSI-RS resources using two antenna ports may enable the UE to evaluate the SPEF of various beams and provide channel state information feedback (CSF) to the base station, as further described below. As used herein, the term "antenna port" refers to a virtual definition that allows estimation of each channel coefficient separately or channel coefficients prior to applying any digital precoding.

In implementations using mmWave signals, each antenna port may be mapped to a polarization (e.g., horizontal or vertical). Each polarization may be transmitted over a set of antenna elements that form an antenna panel. Each element typically includes a double feed (for horizontal and for vertical), so both antenna ports may be transmitted physically over the same antenna elements but on different polarizations. Different CSI-RS ports may be transmitted such that they can be separated on the receiver side (or on different resource elements (REs) or with orthogonal cover codes (OCCs)), enabling channel coefficients to be obtained per transmit port and per receive antenna. The channel coefficients may be represented in a [2×2] matrix. In some embodiments, the CSI-RS may be transmitted without digital precoding (which defines how to combine both antenna ports per each transmission layer) and may enable a search for an optimal precoding on the receiver side. Determining an optimal precoding and rank hypothesis also enables a corresponding SPEF metric to be determined for a given channel. In some embodiments, the base station may transmit a single port over both transmit antennas and/or both polarizations simultaneously on the same resources. In some embodiments, the base station may transmit a single one of horizontal or vertical polarization. In some embodiments, the receiver side may obtain a channel coefficient per receiver antenna, which may be represented in a [2×1] matrix. However, in such embodiments, a receiver may only analyze a channel in the context of beam strength or quality (e.g., reference signal received power (RSRP) or signal-plus-interference to noise ratio (SINR)) of a single layer transmission, but not beam capacity (e.g., an RI=2 hypothesis cannot be tested, and a representative SPEF of the channel cannot be obtained).

In various embodiments, the UE sends to the base station a P3 BM report based on the P3 BM CSI-RS. The P3 BM report may include a CSF report for a channel that is associated with a beam that the UE selects during a P3 session and a proactive indication of whether the UE will perform a UE beam switch from the first UE beam to the second UE beam. In response to determining to perform the UE beam switch from the first UE beam to the second UE beam, the P3 BM report sent by the UE will include an indication that the UE will perform a UE beam switch from the first UE beam to the second UE beam, and a CSF report for a channel associated with a UE beam that the UE selected during a P3 session.

In some embodiments, in response to determining not to perform the UE beam switch from the first UE beam to the second UE beam, the UE may send to the base station a P3 BM report including CSF report corresponding to the first UE beam. In this case the P3 BM report may not include an indication that the UE will perform the beam switch.

The base station may determine whether the P3 BM report includes an indication that the UE will perform the UE serving beam switch from the first UE beam to a second UE. In response to determining that the P3 BM report includes an indication that the UE will perform the UE serving beam switch from the first UE beam to a second UE beam, the base station may determine a UE beam switch slot during which the UE will perform the beam switch. Determining the UE beam switch slot may enable the base station to perform operations coordinated with the UE beam switch slot (such as downlink transmission parameters adjustment to be aligned with a new channel corresponding to a new UE beam). In some embodiments, performing the beam switch in a synchronous manner may enable the UE to switch to a superior UE beam corresponding to the base station serving beam without involving a potential link transient because of invalidated CSI information. Some operations and link quality enhancements that can be enabled in the communication system by synchronized UE beam switching are described below.

In some embodiments, the base station may determine adjusted downlink transmission parameters optimized for a channel associated with the second UE beam based on channel state feedback (CSF) included in the P3 BM report. Then, starting at the beam switch slot, the base station may send a signal (e.g., over a physical downlink shared channel (PDSCH)) to the UE using the adjusted downlink transmission parameters. In some embodiments, starting from the first PDSCH allocation after the UE beam switch time, the UE may receive from the base station control information (such as PDSCH control information) for PDSCH scheduling) with the adjusted downlink transmission parameters (e.g., PDSCH configuration parameters). In some embodiments, the control information may be conveyed by a scheduling downlink control information (DCI).

In response to determining that the P3 BM report does not include an indication that the UE will perform the UE beam switch, the base station may determine adjusted downlink transmission parameters for the current pair of base station and UE serving beams based on the CSF report included in P3 BM report, and may start sending a signal to the UE using the adjusted downlink transmission parameters on a nearest downlink transmission occasion. In some embodiments, the base station may update transmission parameters for the current serving beam (and a channel associated with the current serving beam) based on the CSF corresponding to the first UE beam (included in P3 BM report in case that there is no UE beam switch indication). In such embodiments, the base station may update such transmission parameters immediately.

Various embodiments may improve communication link stability and decrease a probability of beam failure or communication link failure. Various embodiments may improve beam tracking capability and result in correspondingly higher link efficiency. Various embodiments may improve mobility support for mmWave communications.

The term "user equipment" ("UE") is used herein to refer to any one or all of wireless router devices, wireless appliances, cellular telephones, smartphones, portable computing devices, personal or mobile multi-media players, laptop computers, tablet computers, smartbooks, ultrabooks, palm-top computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single UE. The proximity of the SOCs facilitates high speed communications and the sharing of memory and resources.

As used herein, the terms "network," "system," "wireless network," "cellular network," and "wireless communication network" may interchangeably refer to a portion or all of a wireless network of a carrier associated with a UE and/or subscription on a UE. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement global system for mobile communications (GSM) Enhanced Data rates for GSM Evolution (EDGE). In another example, an OFDMA network may implement Evolved UTRA (E-UTRA) (including LTE standards), Institute of Electrical and Electronics Engineers (IEEE) 802.11 (WiFi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

5G NR mmWave communication systems utilize beamforming techniques to transmit and receive highly directional beams. An optimal combination of transmit and receive beams may be determined by the system, and the combination is utilized as a composite beam (sometimes referred to as a serving beam) for transmission of control and data signals (e.g., via a physical downlink control channel (PDCCH) and/or a physical downlink shared channel (PDSCH). To enable efficient and reliable communication over time, the optimal combination of transmit and receive beams may be adaptively identified and tracked by the system.

Currently, beam selection, beam reselection, and beam tracking procedures are performed autonomously by a UE.

A base station serving the UE does not receive any information about such UE behaviors or their timing. However, every time the UE performs a beam switch, a physical channel and its characteristics and capacity may change. Accordingly, when a UE performs a beam switch, some transmit parameters used by the base station and the UE may no longer be optimal and may not be consistent with the new channel obtained after the UE beam switch for a period of time until updated CSI information is available, causing a potential link transient. For example, pervious transmit parameters may not be aligned with a new channel, and previously known CSI may be invalidated by the UE beam switch. Communication link performance may be degraded during the link transient.

Channel state information (CSI) may be used to determine channel conditions and to assist in link adaptation procedures for the serving beam to maintain reliable and efficient communication between the base station and the UE. For a downlink portion of the communication link, the UE may provide to the base station channel state information feedback (CSF), which may include, for example, a rank indicator (RI), a pre-coding matrix indicator (PMI), a channel quality indicator (CQI), and/or other information. The base station may use the CSF to perform one or more link adaptation operations.

However, when a UE performs a beam switch, physical channel characteristics and channel capacity change for the communication link. CSF reports previously transmitted by the UE may no longer be valid for a channel associated with the UE new beam (i.e. the second beam). As a result, for a time period after the UE performs the beam switch and until the UE sends an updated CSF report to the base station, communication link performance may be degraded due to the mismatch between the outdated CSF or the CSI known to the BS and the new channel state information. Even when the UE is not highly mobile (i.e., even in case of low UE mobility), a UE beam switching rate may be significant because of UE rotations and UE environment changes. Every UE beam change can potentially degrade communication link quality (i.e., reliability) for some time duration (e.g., a transient period), or cause a link failure event for the link in some extreme cases. For example, due to a PMI mismatch, the modulation and coding scheme (MCS) may become unreliable. In some cases, the base station may perform an outer link adaptation loop operation and/or decrease the MCS in order to quickly recover from the bad link reliability conditions; however, if such steps are not performed quickly enough (and typically an outer link adaptation response has some latency) this scenario may result in a communication link failure or a beam failure event. In case of link failure, the UE may need to reconnect to the communication network. In some cases, an RI (rank indicator) mismatch may lead to a communication link failure. For example, if an RI=2 was used before the UE beam switch, but resulting channel after the UE beam switch allows only RI=1 (e.g., high correlation exists between the two polarizations received by the second device beam or only a single polarization is properly received over the second UE beam), and an RI=1 should be used after the UE beam switch (e.g., reflecting a stronger RSRP characteristic of the second UE beam, but a lower rank), the network may be unable to transmit both streams over a channel having RI=1. These and other issues may arise from non-synchronous UE beam switching that may be followed by a potential link transient or temporary link reliability problem.

As another example, the UE may perform beam selection and tracking based on synchronization signal block (SSB) signals. In some cases, for example for P3 beam management operations, the UE may utilize a special beam management channel state information reference signal (CSI-RS). According to current technical specification definitions, beam management (including UE beam selection and tracking) is typically based on Reference Signal Receive Power (RSRP) criteria using single receive port reference signals. Beam management CSI-RS signals for P3 operations may be allocated with a single port (two-port allocation is also permitted, but typically is not used), SSB signals may utilize a single port. Millimeter wave signals may use both horizontal and vertical polarizations that are typically well separated and result in a rank=2 (e.g., RI=2) channel, and two layer transmission (i.e., the maximum for mmWave signals) is more likely for most of UEs (for example, where a signal-to-noise ratio (SNR) is greater than a threshold SNR). In some cases, depending on the selected beam (or the antenna modules used), it may be possible for a UE to receive a stronger beam (i.e., having a higher RSRP) that has only single dominating polarization or strongly correlated polarizations that only allows an RI=1 channel. When a UE performs a beam change, the new beam (i.e., the second beam) most likely has a different and/or more suitable PMI compared to the currently used (or known) based on the last CSF update. However, since the base station is unaware that the UE has performed the beam change, the base station may continue to use a PMI and RI selected for a previous beam (i.e., the old beam or first beam). This mismatch may cause downlink quality degradation (referred to herein as a link transient) at least until the next occasion in which the UE reports CSF to the base station. Similarly, the mismatch may cause a link transient in the uplink portion of the communication link at least until a next occasion for the UE to transmit a sounding reference signal (SRS) to the base station. Where the base station and UE utilize two-layer communication, a PMI mismatch may introduce a higher sensitivity than in the case of single layer transmission. In the event that the new beam (i.e., the second beam) is associated with a rank indicator of one (i.e., RI=1), even if the new beam has a higher RSRP, link transient severity maybe even higher, particularly when downlink data communications are performed with two-layer communication (for example, based on the old CSF report).

Various embodiments include methods and systems for mitigating a negative impact of a link transient that may accompany a UE beam switch. In some embodiments, the methods may be applied together with, as part of, or related to a P3 beam management procedure.

Additionally, UE procedures for preliminary UE candidate beam (or beams) selection for beam refinement and beam tracking may be performed using synchronization signal block (SSB) resources. In some embodiments, the UE may select UE candidate beams based on SSB signals. In some embodiments, the UE may evaluate one or more candidate beams based on the P3 BM CSI-RS.

In various embodiments, a base station serving a UE may transmit to the UE a P3 beam management (BM) CSI-RS over a serving base station beam. In some embodiments, the base station may send the P3 BM CSI-RS using two antenna ports. Sending the P3 BM CSI-RS using two antenna ports (2 ports CSI-RS) may enable the UE to evaluate a spectral efficiency (SPEF) metric for the first UE beam and a second UE beam based on the P3 BM CSI-RS. In some embodiments, the UE may determine and compare a SPEF for at least two different beams (e.g., the first UE beam (such as a currently-utilized serving beam) and an alternative, second UE beam). In some embodiments, the P3 BM CSI-RS may include a repetition of CSI-RS resource in time (different OFDM symbols) that enables the UE to test several different UE beams accordingly. The UE may determine whether to perform a UE beam switch from the first UE beam to the second UE beam based on comparison of the corresponding evaluated spectral efficiency metrics. In some embodiments, the UE may determine whether to perform the UE beam switch based on spectral efficiency maximization criteria (rather than RSRP maximization criteria, as is typically done in current mmWave deployments). In some embodiments, the P3 BM reporting is coupled to a P3 session, and may assume that one or more candidate UE beams are tested based on P3 BM CSI-RS signals that have been transmitted using two antenna ports. In some embodiments, CSF availability for the new selected beam may be a byproduct of beam comparison based on spectral efficiency criteria.

The UE may send to the base station a P3 BM report based on the P3 BM CSI-RS. The P3 BM report may include a CSF report. The CSF report included in the P3 BM report may provide information about a channel conveyed by the pair of the serving base station beam from one side and the current serving UE beam or the new serving UE beam from the other side of the link.

In some embodiments, the P3 BM report may include an indication that the UE will perform the beam switch from the first UE beam to the second UE beam. In some embodiments, the indication may include a single bit (e.g., "1" signifying that the UE will perform the beam switch, and "0" signifying that the UE will not perform the beam switch). The base station may receive the P3 BM report and may determine whether the P3 BM report includes the indication that the UE will perform a beam switch from the first UE beam to the second UE beam. The base station may then determine a beam switch slot during which the UE will perform the UE beam switch (UE beam switching will be synchronized with the BS). In some embodiments, the base station may determine adjusted downlink transmission parameters based on CSF included in the P3 BM report. In some embodiments, starting at the UE beam switch slot, the base station may send a signal, such as a physical downlink shared channel (PDSCH) signal, to the UE using the adjusted downlink transmission parameters. In various embodiments, the base station may send the signal (e.g., a unicast PDSCH) to the UE using the adjusted downlink transmission parameters over the channel conveyed by the base station serving beam.

In some embodiments, a slot in which the UE sends the P3 BM report to the base station may be referred to as slot n. The UE may perform the beam switch during a beam switch slot that is N slots after slot n (i.e., during slot n+N). Said another way, the UE may perform the beam switch on a slot that is N slots later than the slot where P3 BM report is provided (slot n). In some embodiments, the slot offset N may be a value defined in a technical specification. In some embodiments, the slot offset N may be configured in a memory of the base station. In some embodiments, the beam switch slot may be any type of slot, such as a downlink slot, and uplink slot, or a mixed slot. In some embodiments, the base station may assume that the UE will perform the beam switch just before a first OFDM (orthogonal frequency division multiplexing) symbol for a downlink and/or uplink signal transmitted to or from the UE on the UE beam switch slot (e.g., n+N). In various embodiments, the UE beam switch slot may be used as a time index or slot index that enables synchronized operations between the UE and the base station (e.g. a synchronized UE beam switching). In some embodiments, the UE beam switch slot may be any kind of slot (including a downlink slot, an uplink slot, or a mixed slot). In some embodiments, the base station may be configured to determine that the UE will perform the UE beam switch just before the first OFDM symbol of the downlink or the uplink slot.

In various embodiments, the base station may receive the proactive beam switch notification (i.e., the indication that the UE will perform the beam switch) in the P3 BM report, and may perform a link transient mitigation operation (or one or more link transient mitigation operations). In some embodiments, starting at the beam switch slot (e.g., slot n+N), the base station may adjust downlink transmission parameters (such as physical downlink shared channel (PDSCH) parameters) for sending signals to the UE on a channel associated with the second UE beam. This PDSCH transmission parameters adjustment may be done based on CSF included in P3 BM report (this CSF report will correspond to the downlink channel obtained with the most convenient UE beam that was selected during the P3 BM session).

In some embodiments, scheduling a P3 beam management procedure includes sending a repetitive pilot signal spanning several orthogonal frequency division multiplexing (OFDM) symbols (which may be consecutive or non-consecutive OFDM symbols) that may not be multiplexed with other downlink signals (because, e.g., the symbols are dedicated for UE beam sweeping). In some embodiments, to reduce signaling overhead associated with the P3 beam management procedure, the base station may limit the OFDM symbols used for the P3 beam management procedure to two OFDM symbols (e.g., repetition=2). In some embodiments, the first symbol may be used by the UE for testing and evaluation of the first UE beam (the current serving UE beam). In some embodiments, another signal transmitted to the UE may be multiplexed with the first symbol, such as a PDSCH signal, a tracking reference signal (TRS), or a CSI-RS for a P2 beam management procedure. In some embodiments, the second symbol may be used by the UE for testing and evaluation of the second UE beam (a candidate UE beam). Testing a candidate beam on the second OFDM symbol may not allow a reliable demodulation by the UE of any other downlink signal multiplexed with P3 BM CSI-RS on this symbol. In some embodiments, another signal intended for a second UE sharing the same base station serving beam may be multiplexed in the frequency domain on the second OFDM symbol with P3 BM CSI-RS resource transmitted to the first UE. In some embodiments, the UE may determine which of the first UE beam and the second UE beam has a greater signal strength (e.g., Reference Signal Receive Power (RSRP)). In some embodiments, where a two port CSI-RS signal is used for P3 BM allocation, the UE may determine which of the first UE beam and the second UE beam has a higher SPEF metric. In some embodiments, the base station may send information to the UE scheduling a P3 beam management procedure based at least on two repetitions of a P3 BM CSI-RS resource transmitted on at least two OFDM symbols of a slot (which may be consecutive or non-consecutive symbols). In such embodiments, the first repetition of the P3 BM CSI-RS resource may be transmitted on a first orthogonal frequency division multiplexing (OFDM) symbol and a second repetition of the P3 BM CSI-RS resource may be transmitted on a second OFDM symbol. In such embodiments, the first OFDM symbol may be assumed (or predefined by the specification) by the BS and the UE as the symbol where the UE will evaluate the first UE beam, and the second OFDM symbol (which may be two or more OFDM symbols) may be assumed to be used by the UE to evaluate the second UE beam (one or more candidate beams).

In some embodiments, the base station may schedule (i.e., may send scheduling information for) an aperiodic sounding reference signal (SRS) for the UE during the beam switch slot (e.g., slot n+N) or during a next-available uplink slot. The UE may transmit the SRS according to the schedule. The base station may process the SRS and may determine updated parameters/configuration for uplink data transmissions (e.g., PUSCH) from the UE on the second UE beam (after the UE beam switch). Scheduling the SRS and determining the updated uplink data channel parameters in this manner may reduce the potential uplink link transient to a relatively small number of slots (also referred to as an SRS turnaround time). In some embodiments, the base station may avoid scheduling uplink data transmissions from the UE until after configuring/signaling to a UE the adjusted parameters for uplink data transmissions from the UE. In some embodiments, the base station may schedule uplink data transmission opportunities for the UE using the second UE beam with an increased modulation and coding scheme (MCS) back off until the nearest opportunity to adjust uplink transmission parameters after UE beam switch based on SRS. In some embodiments, based on the SRS processing the network may configure precoding, a number of layers, and an MCS to be used for uplink transmissions from the UE. In some embodiments, a nearest opportunity may include a full turn around, such as the following operations: SRS scheduling (by the base station), SRS transmission (by the UE), SRS measurement (by the base station), and adjusting uplink transmission parameters (by the base station). In some embodiments, a shortest turn around may include: SRS transmission scheduled on UE beam switch slot (or a nearest uplink slot after it), immediate SRS processing by the base station, and transmission/reconfiguration of the adjusted parameters on the nearest downlink slot (for the nearest uplink transmission). The transmission may be triggered grant based (DCI scheduling) or configured grant based (e.g., radio resource control (RRC) based configured). For DCI scheduling (triggered grant based), the base station may change information in the DCI fields relatively quickly. An RRC based configured (configured grant based) transmission requires the sending and processing of RRC reconfiguration signaling, which is not synchronous and involves relatively high latency.

In some embodiments, the base station may schedule (i.e., may send scheduling information for) an aperiodic tracking reference signal (TRS) during the beam switch slot or during a next-available downlink slot. The base station may transmit the TRS according to the scheduling information. The UE may receive and process the TRS, and based on the TRS the UE may refine an estimation of channel characteristics of a channel associated with the second UE beam. In some embodiments, the base station may perform P2 beam management operations on a downlink slot after the UE beam switch slot, to perform Tx beam refinement for the second UE beam following the UE beam switch by the UE.

In some embodiments, the UE may determine not to perform a UE beam switch, and may send a P3 BM report that does not include an indication that the UE will perform the UE beam switch. The UE may send a CSF that includes a refreshed CSF for the current composite serving beam. In such embodiments, downlink transmission parameters may be adjusted (e.g., by the base station) at any time or in any slot that the base station finds appropriate (as in case of a regular link adaptation CSF report), since there will be no UE beam switch that these parameters adjustment should be synchronized with it.

FIG. 1 is a system block diagram illustrating an example communications system 100. The communications system 100 may be a 5G New Radio (NR) network, or any other suitable network such as a Long Term Evolution (LTE) network. While FIG. 1 illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140 and a variety of UEs (illustrated as UEs 120a-120e in FIG. 1). The communications system 100 also may include a number of base stations (illustrated as the BS 110a, the BS 110b, the BS 110c, and the BS 110d) and other network entities. A base station is an entity that communicates with UEs, and also may be referred to as a Node B, an LTE Evolved nodeB (eNodeB or eNB), an access point (AP), a Radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used. The core network 140 may be any type core network, such as an LTE core network (e.g., an evolved packet core (EPC) network), 5G core network, etc.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The UE 120a-120e may communicate with the base station 110a-110d over a wireless communication link 122.

The wired communication link 126 may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (such as relay BS 110d). A relay station is an entity that can receive a transmission of data from an upstream station (for example, a base station or a UE) and send a transmission of the data to a downstream station (for example, a UE or a base station). A relay station also may be a UE that can relay transmissions for other UEs. In the example illustrated in FIG. 1, a relay station 110d may communicate with macro the base station 110a and the UE 120d in order to facilitate communication between the base station 110a and the UE 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The UEs 120a, 120b, 120c may be dispersed throughout communications system 100, and each UE may be stationary or mobile. A UE also may be referred to as an access terminal, a terminal, a mobile station, a subscriber unit, a station, a mobile device, etc.

A macro base station 110a may communicate with the communication network 140 over a wired or wireless communication link 126. The UEs 120a, 120b, 120c may communicate with a base station 110a-110d over a wireless communication link 122.

The wireless communication links 122 and 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, some implementations may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per UE. Multi-layer transmissions with up to 2 streams per UE may be supported.

Aggregation of multiple cells may be supported with up to eight serving cells. Alternatively, NR may support a different air interface, other than an OFDM-based air interface.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (for example, remote device), or some other entity. A wireless computing platform may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband Internet of things) devices. The UE 120a-120e may be included inside a housing that houses components of the UE 120a-120e, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an EPC network) in a 5G NSA network. Other example network configurations may include a 5G standalone (SA) network in which a 5G/NR RAN connects to a 5G core network.

In some implementations, two or more UEs (for example, illustrated as the UE 120a and the UE 120e) may communicate directly using one or more sidelink channels (for example, without using a base station 110a-d as an intermediary to communicate with one another). For example, the UEs 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120a-120e may perform scheduling operations, resource selection operations, as well as other operations described elsewhere herein as being performed by the base station 110a-110d.

Figure 2A:
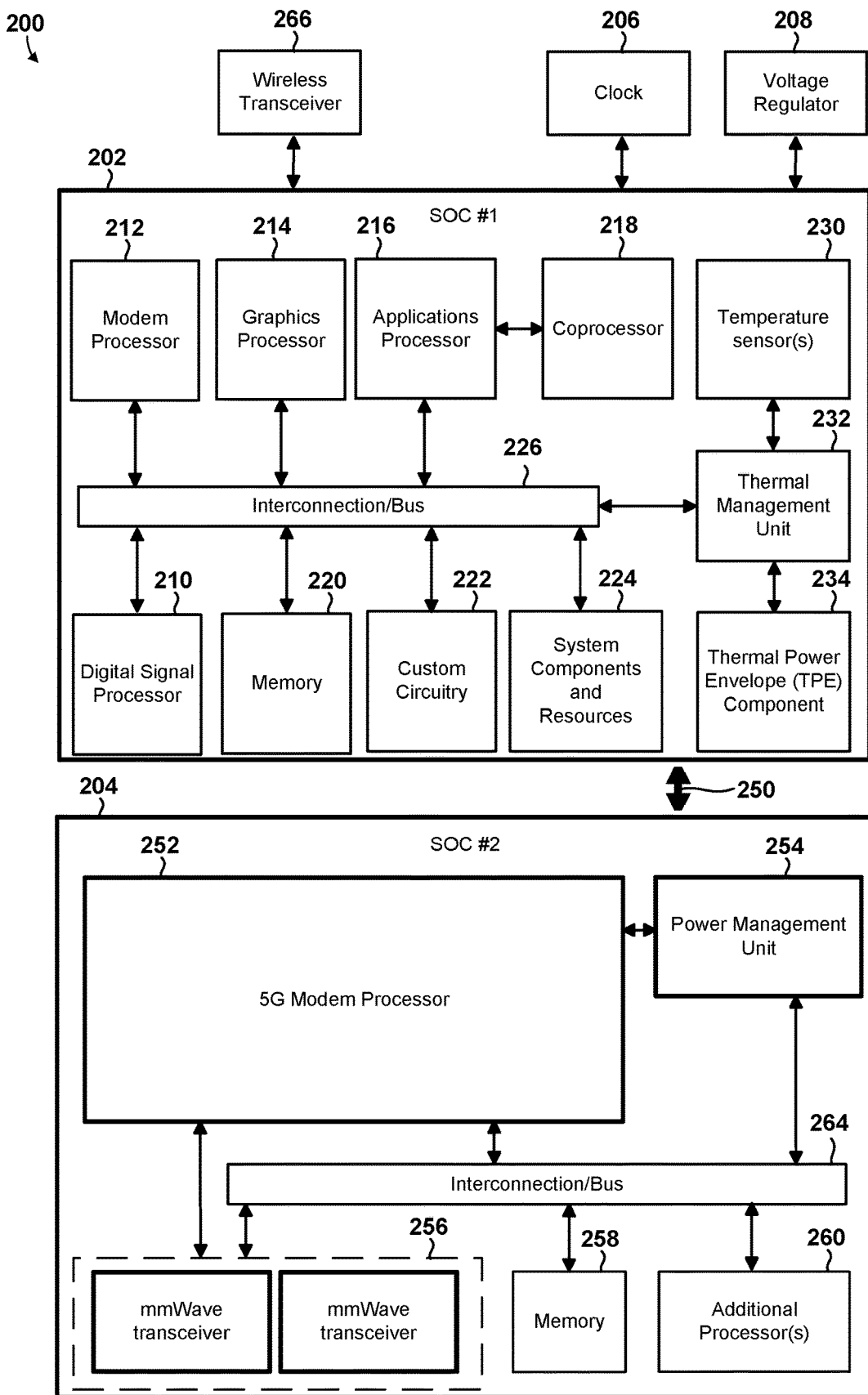
FIG. 2A is a component block diagram illustrating an example computing and wireless modem system suitable for implementing any of the various embodiments.

FIG. 2A is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2A, the illustrated example computing system 200 (which may be a SIP in some embodiments) includes a two SOCs 202, 204 coupled to a clock 206, a voltage regulator 208, and a wireless transceiver 266 configured to send and receive wireless communications via an antenna (not shown) to/from UEs, such as a base station 110a. In some implementations, the first SOC 202 may operate as central processing unit (CPU) of the UE that carries out the instructions of software application programs by performing the arithmetic, logical, control and input/output (I/O) operations specified by the instructions. In some implementations, the second SOC 204 may operate as a specialized processing unit. For example, the second SOC 204 may operate as a specialized 5G processing unit responsible for managing high volume, high speed (such as 5 Gbps, etc.), or very high frequency short wave length (such as 28 GHz mmWave spectrum, etc.) communications.

The first SOC 202 may include a digital signal processor (DSP) 210, a modem processor 212, a graphics processor 214, an application processor 216, one or more coprocessors 218 (such as vector co-processor) connected to one or more of the processors, memory 220, custom circuity 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a UE. The system components and resources 224 or custom circuitry 222 also may include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates or implement a bus architecture (such as CoreConnect, AMBA, etc.). Communications may be provided by advanced interconnects, such as high-performance networks-on chip (NoCs).

The first or second SOCs 202, 204 may further include an input/output module (not illustrated) for communicating with resources external to the SOC, such as a clock 206 and a voltage regulator 208. Resources external to the SOC (such as clock 206, voltage regulator 208) may be shared by two or more of the internal SOC processors/cores.

In addition to the example SIP 200 discussed above, some implementations may be implemented in a wide variety of computing systems, which may include a single processor, multiple processors, multicore processors, or any combination thereof.

Figure 2B:
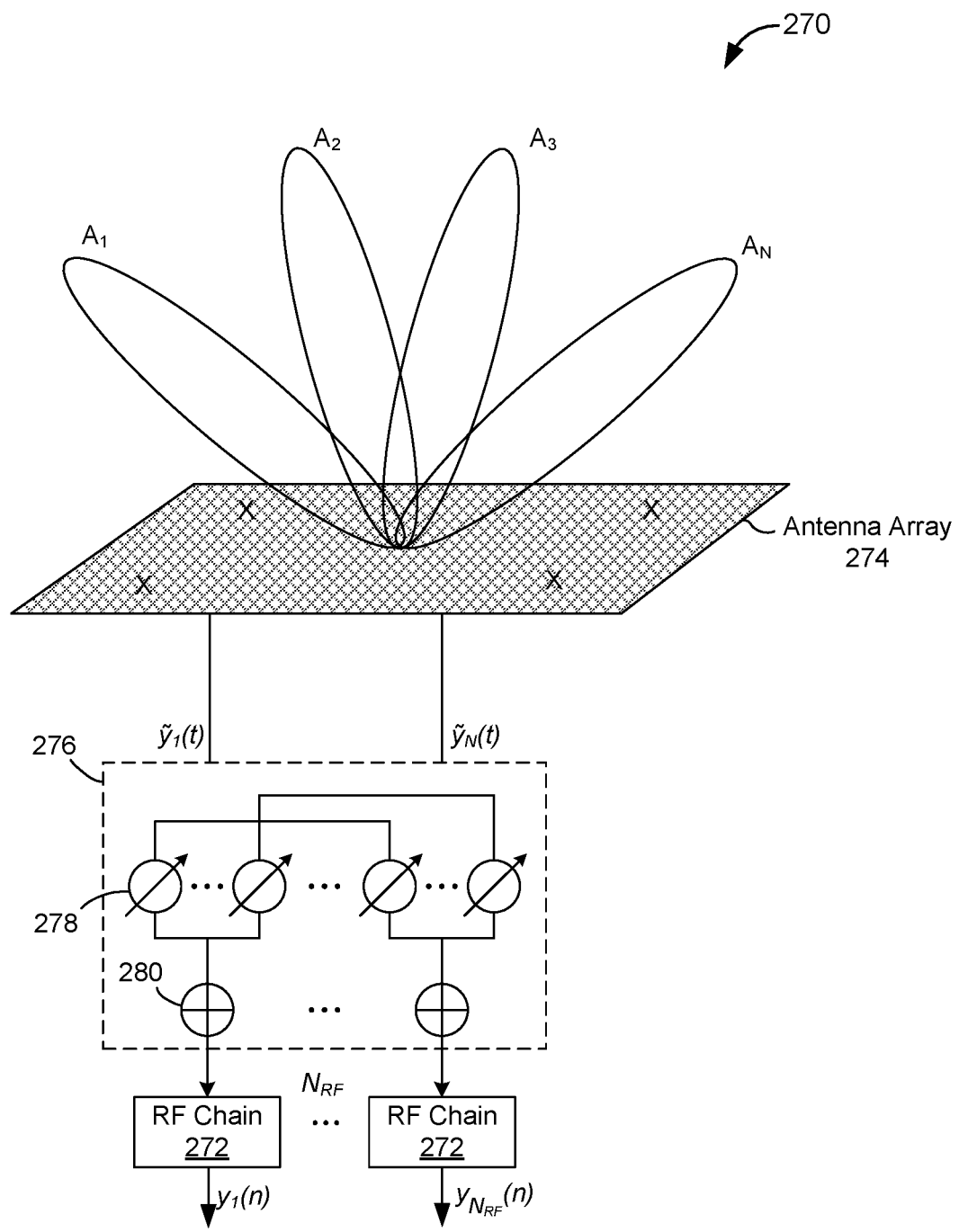
FIG. 2B is a component block diagram illustrating a mmWave receiver suitable for implementing any of the various embodiments.
Figure 2C:
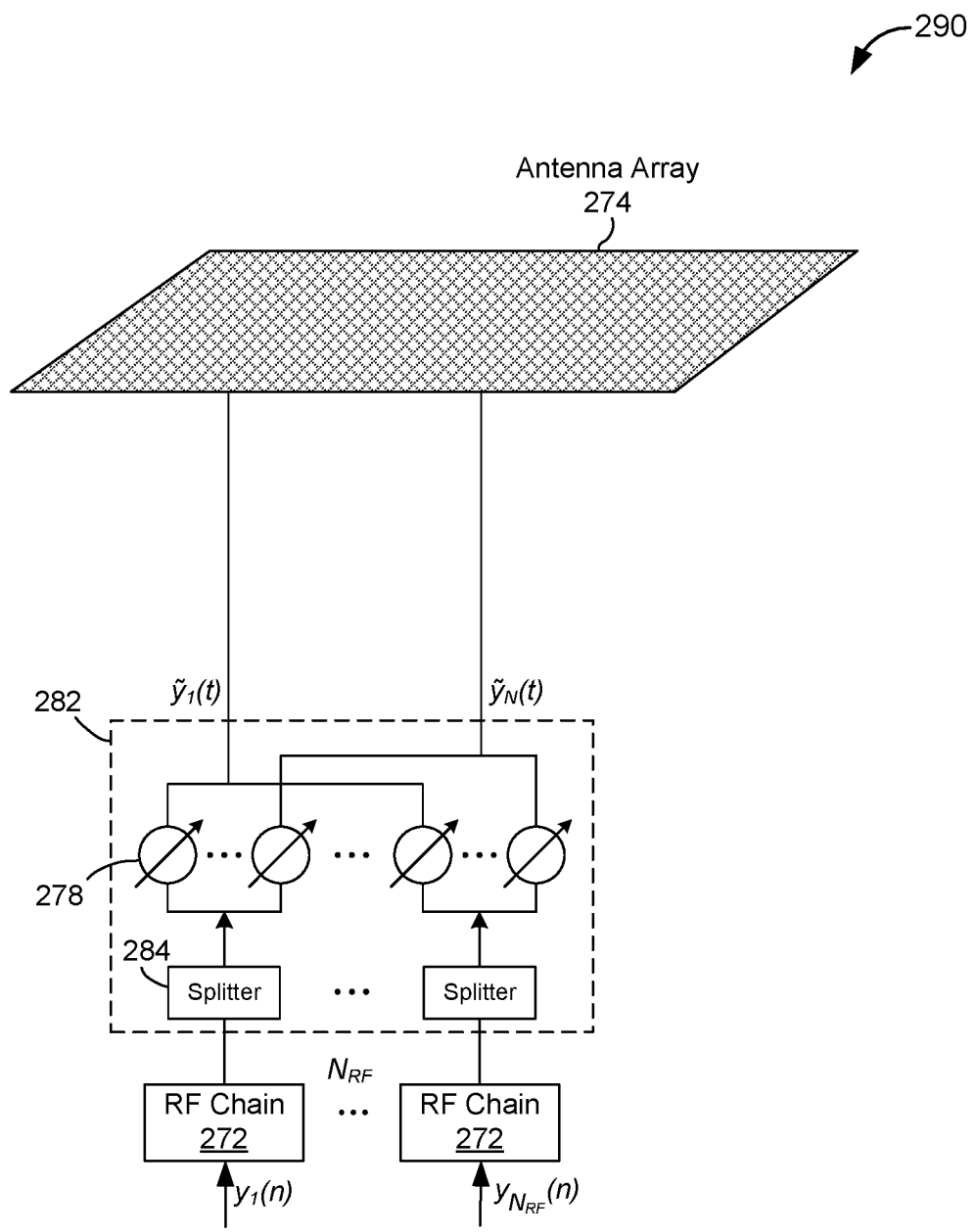
FIG. 2C is a component block diagram illustrating a mmWave transmitter suitable for implementing any of the various embodiments.

FIG. 2B is a component block diagram illustrating a mmWave receiver 270, and FIG. 2C is a component block diagram illustrating a mmWave transmitter 290, suitable for use with various aspects. The mmWave receiver 270 and the mmWave transmitter 290 may also be referred to as beamforming architectures. With reference to FIGS. 1-2C, the mmWave receiver 270 and the mmWave transmitter 290 may be used in a UE (e.g., 120a-120e, 200) or a base station (e.g., 110a-110d, 200).

In various aspects, a UE may be configured with both the mmWave receiver 270 and the mmWave transmitter 290 (i.e., with both architectures), and may use either or both. As an example, the mmWave receiver 270 architecture and the mmWave transmitter 290 architecture may be portions of the mmWave transceivers 256. Implementing a UE with multiple architectures addresses limitations of a single static architecture. One architecture may be efficient (e.g., use an appropriate spectral efficiency, resolution, and/or power consumption and/or the like) for a first set of communications and another architecture may be efficient for a second set of communications. In contrast, static selection of a single architecture may cause inefficient utilization of computing, communication, network, and/or power resources by using the single architecture to transmit and/or receive communications.

Referring to FIG. 2B, the mmWave receiver 270 includes an antenna array 274 of a plurality of antenna elements included within one or more antenna panels. In FIG. 2B, the value "N" represents the number of antenna elements in the antenna array 274. The antenna array 274 may include a plurality of cross-polarized antennas (each symbolized by an "X"). In some aspects, the UE may be configured with four dual-pole antennas (i.e., eight in total). Based on a selected beamforming codebook, which may be translated into a set of phase shifts in an analog beamforming block, the UE may form beams $A_1$ up to $A_N$.

A mmWave receiver 270 may be configured to perform analog or hybrid beamforming. A signal $\tilde{y}_N(t)$ received at an antenna N of the antenna array 274 at a time t may propagate to a hybrid beamforming circuit 276. Hybrid beamforming may be performed in radio frequency (RF) or at an intermediate frequency (IF) through the hybrid beamforming circuit 276. The hybrid beamforming circuit 276 may include a bank of phase shifters 278 and a summer 280 connected to some of the antenna elements. While analog and hybrid beamforming techniques are generally power efficient, they are only capable of receiving in a few directions. If a mmWave signal is received outside of an analog beam supported by the mmWave receiver 270, degradation in signal quality or even beam failure may be experienced.

A mmWave receiver 270 suitable for use with various aspects may be configured to perform analog or hybrid beamforming. The mmWave receiver 270 may perform beamforming in baseband frequencies. In the mmWave receiver 270, the number of antenna elements (e.g., 1-N) of the antenna array 274 may correspond to the number of RF chains 272 (e.g., 1-$N_{RF}$). In some aspects, the UE may be configured with high-resolution ADCs (one per RF chain).

Referring to FIG. 2C, the mmWave transmitter 290 may include the antenna array 274 of a plurality of antenna elements included within one or more antenna panels. The mmWave transmitter 290 may include a transmitter hybrid beamforming circuit 282 that may receive n signals from N RF chains 272. The transmitter hybrid beamforming circuit 282 may include a band of splitters 284 and a bank of phase shifters 278. The transmitter hybrid beamforming circuit 282 may propagate a signal $\tilde{y}_N(t)$ to an antenna N of the antenna array 274.

Figure 3:
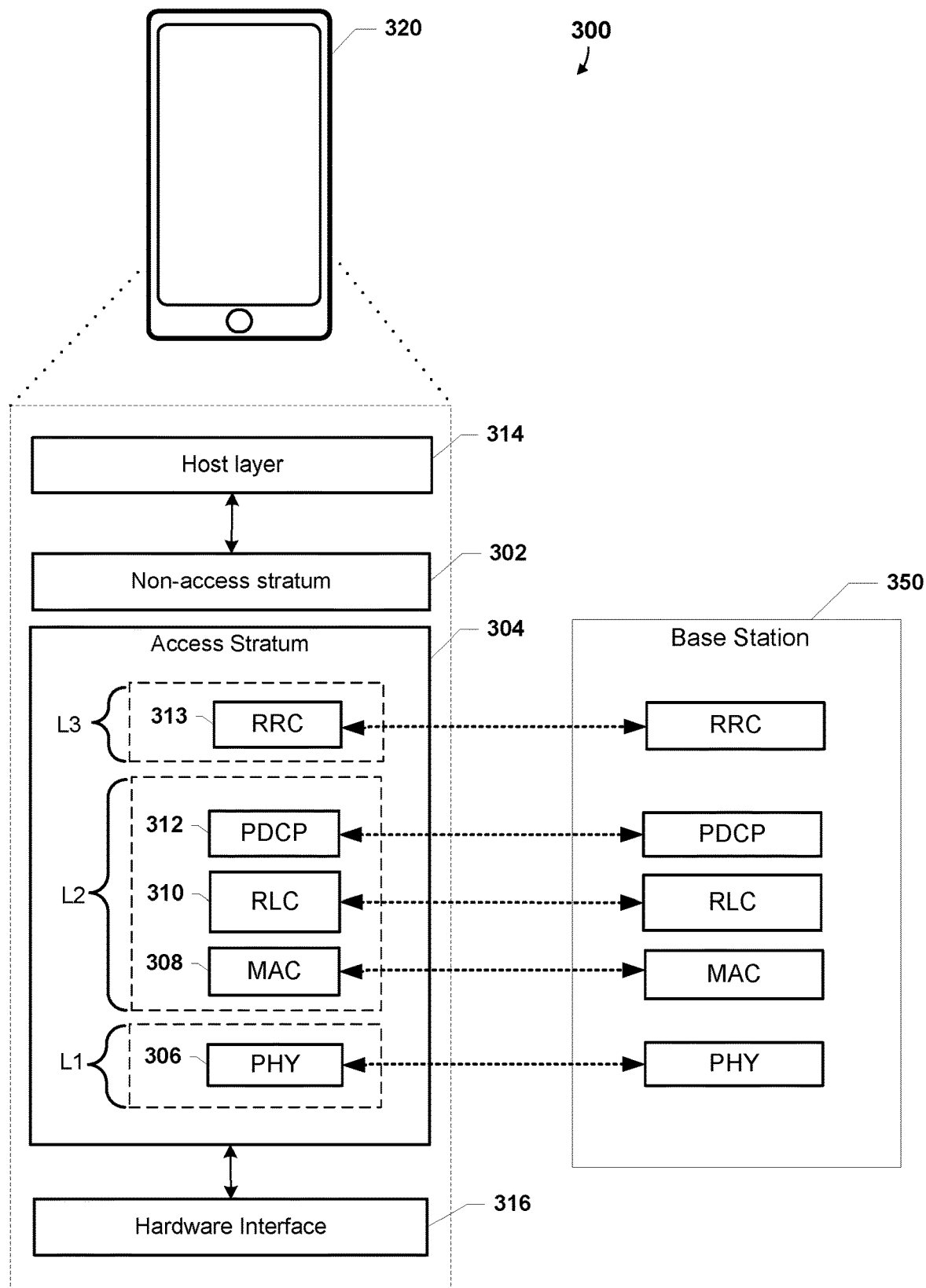
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1-3, the UE 320 may implement the software architecture 300 to facilitate communication between a UE 320 (e.g., the UE 120a-120e, 200) and the base station 350 (e.g., the base station 110a-110d) of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) UE, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the UE (such as SIM(s) 204) and its core network 140. The AS 304 may include functions and protocols that support communication between a SIM(s) (such as SIM(s) 204) and entities of supported access networks (such as a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission or reception over the air interface via a wireless transceiver (e.g., 266). Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the UE 320 and the base station 350 over the physical layer 306. In some implementations, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include an RRC sublayer 3. While not shown, the software architecture 300 may include additional Layer 3 sublayers, as well as various upper layers above Layer 3. In some implementations, the RRC sublayer 313 may provide functions including broadcasting system information, paging, and establishing and releasing an RRC signaling connection between the UE 320 and the base station 350.

In some implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the UE 320. In some implementations, application-specific functions provided by the at least one host layer 314 may provide an interface between the software architecture and the general purpose processor 206.

In other implementations, the software architecture 300 may include one or more higher logical layer (such as transport, session, presentation, application, etc.) that provide host layer functions. For example, in some implementations, the software architecture 300 may include a network layer (such as Internet protocol (IP) layer) in which a logical connection terminates at a packet data network (PDN) gateway (PGW). In some implementations, the software architecture 300 may include an application layer in which a logical connection terminates at another device (such as end user device, server, etc.). In some implementations, the software architecture 300 may further include in the AS 304 a hardware interface 316 between the physical layer 306 and the communication hardware (such as one or more radio frequency (RF) transceivers).

Figure 4A:
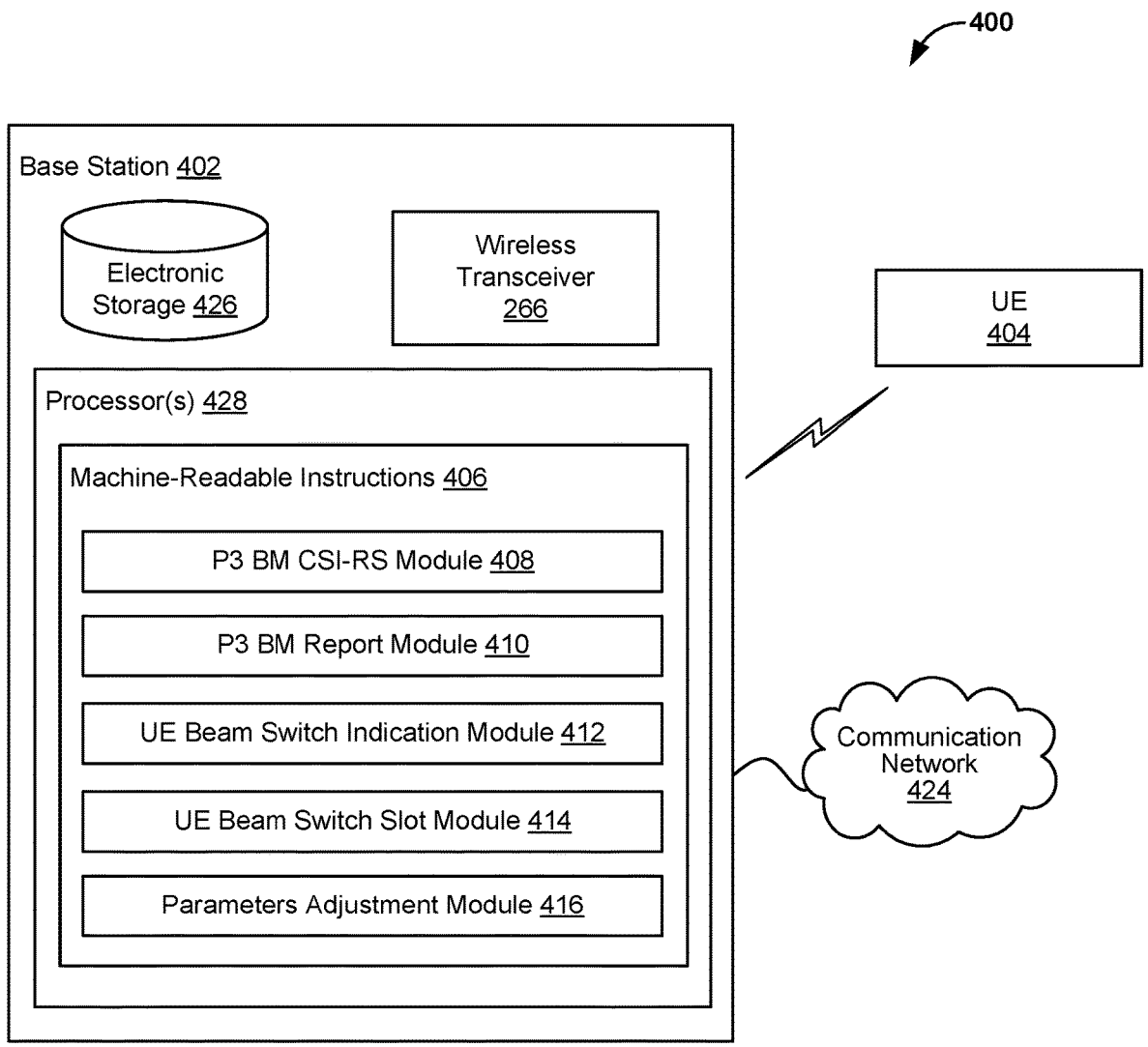
FIG. 4A is a component block diagram illustrating components and processing modules of a base station suitable for use with various embodiments.
Figure 4B:
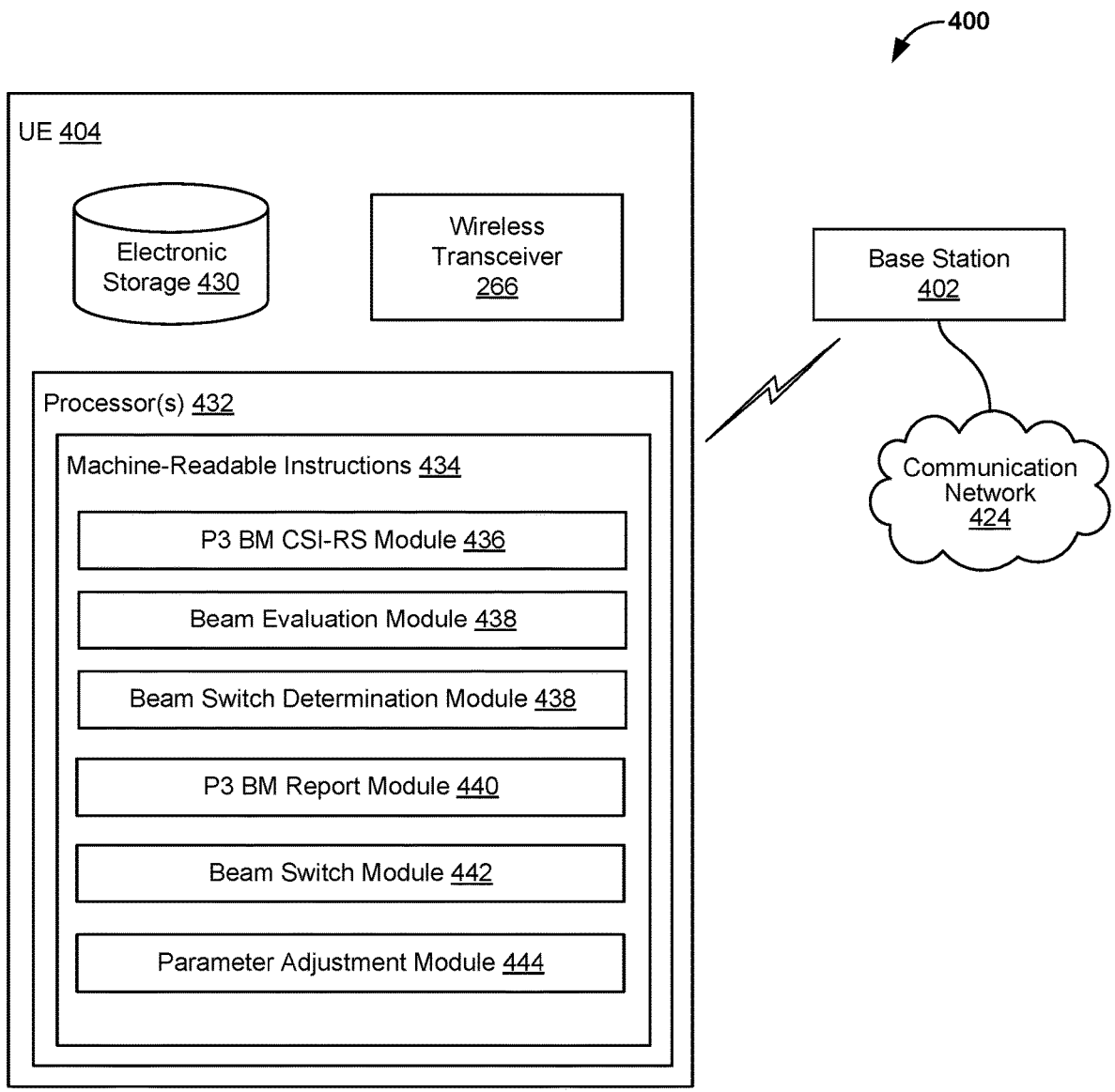
FIG. 4B is a component block diagram illustrating components and processing modules of a UE suitable for use with various embodiments.

FIGS. 4A and 4B are component block diagrams illustrating a system 400 configured for UE beam reselection suitable for use with various embodiments. With reference to FIGS. 1-4B, system 400 may include a base station 402 and a UE 404 (e.g., 110a-110d, 120a-120e, 200, 320, 350). The base station 402 and the UE 404 exchange wireless communications in order to establish a wireless communication link 122, 124, 126.

The base station 402 and the UE 404 may include one or more processors 428, 432 coupled to electronic storage 426, 430 and a wireless transceiver (e.g., 266). In the base station 402 and the UE 404, the wireless transceiver 266 may be configured to receive messages sent in transmissions and pass such message to the processor(s) 428, 432 for processing. Similarly, the processor 428, 432 may be configured to send messages for transmission to the wireless transceiver 266 for transmission.

Referring to the base station 402, the processor(s) 428 may be configured by machine-readable instructions 406. Machine-readable instructions 406 may include one or more instruction modules. The instruction modules may include computer program modules. The instruction modules may include one or more of a P3 BM CSI-RS module 408, a P3 BM report module 410, a UE beam switch indication module 412, a UE beam switch slot module 414, a parameters adjustment module 416, or other instruction modules.

The P3 BM CSI-RS module 408 may be configured to transmit to a UE a P3 beam management (BM) channel state information reference signal (CSI-RS) over a serving base station beam The CSF module 410 may be configured to receive from the UE a P3 BM report for the serving base station beam in response to the P3 BM CSI-RS.

The UE beam switch indication module 412 may be configured to determine whether the P3 BM report includes an indication that the UE will perform a UE serving beam switch from a first UE beam to a second UE beam.

The UE beam switch slot module 414 may be configured to determine a UE beam switch slot during which the UE will perform the beam switch in response to determining that the P3 BM report includes an indication that the UE will perform the UE serving beam switch from the first UE beam to a second UE beam.

The parameters adjustment module 416 may be configured to determine adjusted downlink transmission parameters based on channel state feedback (CSF) included in the P3 BM report.

Referring to the UE 404, the processor(s) 432 may be configured by machine-readable instructions 434. Machine-readable instructions 406 may include one or more instruction modules. The instruction modules may include computer program modules. The instruction modules may include one or more of a P3 BM CSI-RS module 436, a beam evaluation module 438, a beam switch determination module 438, a P3 BM report module 440, a beam switch module 442, a parameters adjustment module 444, or other instruction modules.

The P3 BM CSI-RS module 436 may be configured to receive from a base station a P3 beam management channel state information reference signal (P3 BM CSI-RS).

The beam evaluation module 438 may be configured to evaluate a first UE beam and a second UE beam based on the P3 BM CSI-RS.

The beam switch determination module 438 may be configured to determine whether to perform a UE beam switch from the first UE beam to the second UE beam based on the evaluation of the first UE beam and the second UE beam.

The P3 BM report module 440 may be configured to send to the base station a P3 BM report based on the P3 BM CSI-RS for the UE beam that the UE selects during the P3 BM procedure. As noted above, the P3 BM report includes a CSF report that corresponds to the beam selected by the UE and an indication of whether the UE will perform a UE beam switch from the first UE beam to the second UE beam.

The beam switch module 442 may be configured to perform the beam switch from the first UE beam to the second UE beam during a UE beam switch slot.

The parameter adjustment module 442 may be configured to receive from the base station control information to adjust data communication parameters based on the CSF report provided as a part of P3 BM report.

In some embodiments, the base station 402 and the UE 404 may be operatively linked via one or more electronic communication links (e.g., wireless communication link 122, 124, 126). It will be appreciated that this is not intended to be limiting, and that the scope of this disclosure includes embodiments in which the base station 402 and the UE 404 may be operatively linked via some other communication medium.

The electronic storage 426, 430 may include non-transitory storage media that electronically stores information. The electronic storage media of electronic storage 426, 430 may include one or both of system storage that is provided integrally (i.e., substantially non-removable) with the base station 402 and the UE 404 and/or removable storage that is removably connectable to the base station 402 and the UE 404 via, for example, a port (e.g., a universal serial bus (USB) port, a firewire port, etc.) or a drive (e.g., a disk drive, etc.). Electronic storage 426, 430 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 426, 430 may include one or more virtual storage resources (e.g., cloud storage, a virtual private network, and/or other virtual storage resources). Electronic storage 426, 430 may store software algorithms, information determined by processor(s) 428, 432, information received from the base station 402 and the UE 404, or other information that enables the base station 402 and the UE 404 to function as described herein.

Processor(s) 428, 432 may be configured to provide information processing capabilities in the base station 402 and the UE 404. As such, the processor(s) 428, 432 may include one or more of a digital processor, an analog processor, a digital circuit designed to process information, an analog circuit designed to process information, a state machine, and/or other mechanisms for electronically processing information. Although the processor(s) 428, 432 are illustrated as single entities, this is for illustrative purposes only. In some embodiments, the processor(s) 428, 432 may include a plurality of processing units and/or processor cores. The processing units may be physically located within the same device, or processor(s) 428, 432 may represent processing functionality of a plurality of devices operating in coordination. The processor(s) 428, 432 may be configured to execute modules 408-416 and modules 436-442 and/or other modules by software; hardware; firmware; some combination of software, hardware, and/or firmware; and/or other mechanisms for configuring processing capabilities on processor(s) 428, 432. As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 408-416 and modules 436-442 described below is for illustrative purposes, and is not intended to be limiting, as any of modules 408-416 and modules 436-442 may provide more or less functionality than is described. For example, one or more of the modules 408-416 and modules 436-442 may be eliminated, and some or all of its functionality may be provided by other modules 408-416 and modules 436-442. As another example, the processor(s) 428, 432 may be configured to execute one or more additional modules that may perform some or all of the functionality attributed below to one of the modules 408-416 and modules 436-442.

Figure 5A:
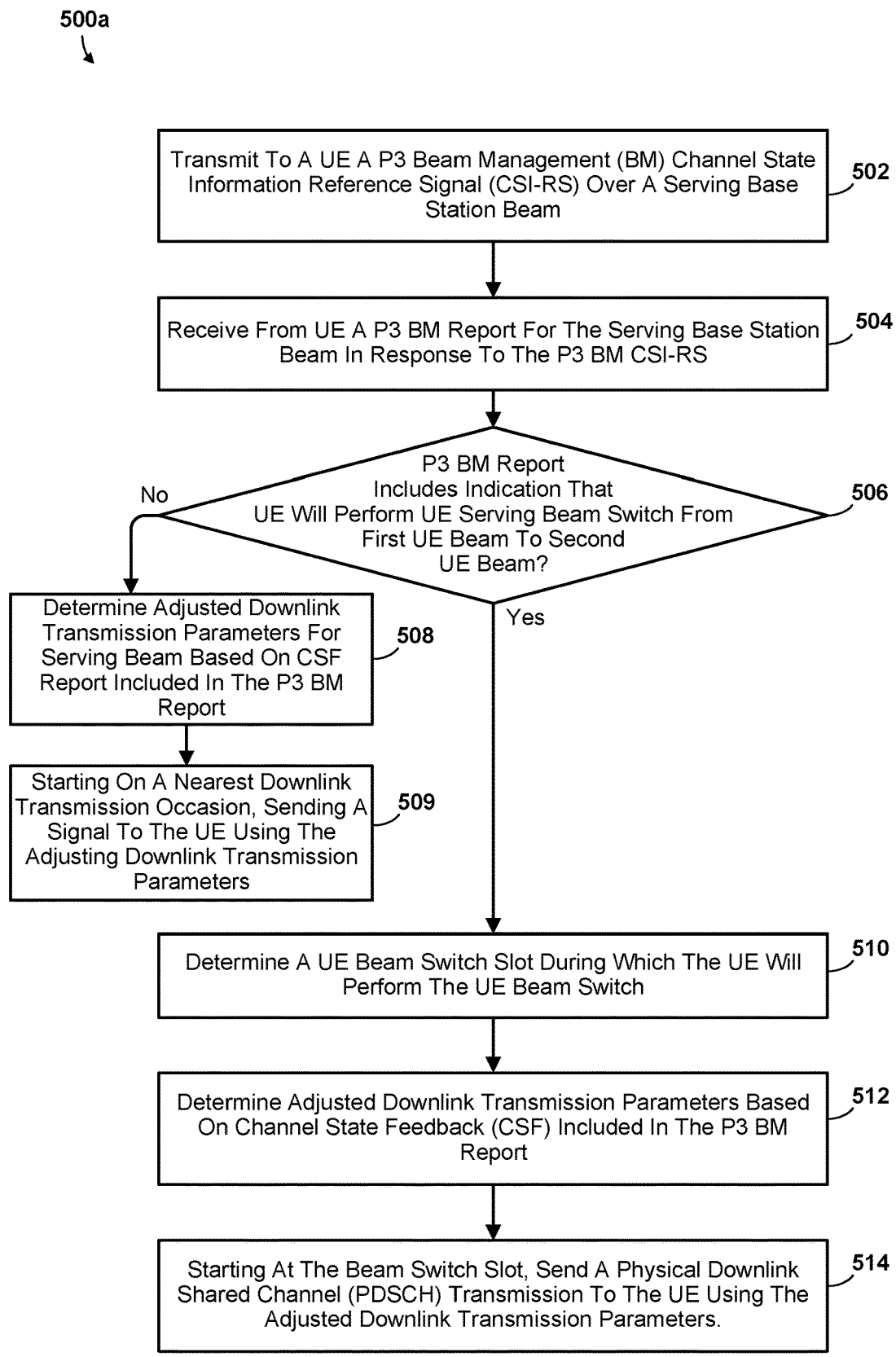
FIG. 5A is a process flow diagram illustrating a method performed by a processor of a base station for UE beam reselection according to various embodiments.

FIG. 5A is a process flow diagram illustrating a method 500a performed by a processor of a base station for UE beam reselection according to various embodiments. Various embodiments may enable the base station to support a synchronous UE beam change and to perform operations to mitigate a potential link transient that may follow UE beam reselection. With reference to FIGS. 1-5A, the operations of the method 500a may be performed by a processor (such as the processor 210, 212, 214, 216, 218, 252, 260, 428) of a base station (such as the base station 110a-110d, 200, 350, 402).

In block 502, the processor may transmit to a UE a P3 beam management (BM) channel state information reference signal (CSI-RS) over a serving base station beam. In some embodiments, the processor may send the P3 BM CSI-RS using two antenna ports. In some embodiments, the processor may send the P3 BM CSI-RS to the UE using a first orthogonal frequency division multiplexing (OFDM) symbol and a second OFDM symbol. In such embodiments, the first OFDM symbol may be assumed by a BS and a UE to be used by a UE to evaluate the first UE (UE) beam (the current serving UE beam), and the second OFDM symbol may be assumed to be used by a UE to evaluate the second UE beam (a candidate UE beam). Means for performing functions of the operations in block 502 may include the processor (e.g., 210, 212, 214, 216, 218, 252, 260, 428) and the wireless transceiver (e.g., 266).

In block 504, the processor may receive from the UE a P3 BM report for the serving base station beam in response to the P3 BM CSI-RS. Means for performing functions of the operations in block 504 may include the processor (e.g., 210, 212, 214, 216, 218, 252, 260, 428).

In block 506, the processor may determine whether the P3 BM report includes an indication that the UE will perform a beam switch from a first UE beam to a second UE beam. In some embodiments, the indication that the UE will perform a beam switch from a first UE beam to a second UE beam may include a single bit indication. In some embodiments, the indication that the UE will perform the beam switch from the first UE beam to a second UE beam may indicate (or enable the base station to infer) that the second UE beam has a higher spectral efficiency (SPEF) or a higher SPEF metric than the first UE beam. Means for performing functions of the operations in determination block 506 may include the processor (e.g., 210, 212, 214, 216, 218, 252, 260, 428).

In response to determining that the P3 BM report does not include an indication that the UE will perform a beam switch (i.e., determination block 506="No"), the processor may determine adjusted downlink transmission parameters for the serving beam based on the CSF report included in the P3 BM report in block 508. For example, the processor may use information in a CSF report (included in P3 BM report) to refine PDSCH transmission parameters of the serving beam (e.g., over the channel associated with the serving base station beam and the first UE beam in block 508). In such embodiments, the base station may adjust the downlink (e.g., PDSCH) transmission parameters at any time or in any slot (at the nearest occasion), since there will be no UE beam switch with which these parameters adjustment should be synchronized. Means for performing functions of the operations in block 508 may include the processor (e.g., 210, 212, 214, 216, 218, 252, 260, 428).

In block 509, starting on a nearest downlink transmission occasion, the processor may send a signal to the UE using the adjusted downlink transmission parameters. For example, the processor may transmit a PDSCH signal using the adjusted downlink transmission parameters. In some embodiments, the base station may utilize the adjusted downlink transmission parameters immediately (e.g., the base station may not wait until a beam switch slot before using the adjusted downlink transmission parameters). Means for performing functions of the operations in block 509 may include the processor (e.g., 210, 212, 214, 216, 218, 252, 260, 428) and the wireless transceiver (e.g., 266).

In response to determining that the P3 BM report includes an indication that the UE will perform a beam switch (i.e., determination block 506="Yes"), the processor may determine a beam switch slot during which the UE will perform the UE beam switch in block 510. In some embodiments, the beam switch slot may be characterized as a time index or slot index, in a manner that enables the base station to perform operations synchronized with the UE beam switch. In some embodiments, the processor may determine the beam switch slot based on a slot in which the base station receives the P3 BM report with the indication that the UE will perform a beam switch plus a relative slot offset. In some embodiments, the processor may determine that the beam switch slot may be a predetermined number of slots away from a slot in which the processor received the notification that the UE will perform the UE beam switch. In some embodiments, the beam switch slot may be any type of slot (e.g., a downlink slot, and uplink slot, or a mixed slot). In some embodiments, the processor may determine that the UE beam switch will be performed by the UE just before a first OFDM symbol for both a downlink slot and an uplink slot. Means for performing functions of the operations in block 510 may include the processor (e.g., 210, 212, 214, 216, 218, 252, 260, 428).

In block 512, the processor may determine adjusted downlink parameters based on channel state feedback (CSF) included in the P3 BM report. Means for performing functions of the operations in block 512 may include the processor (e.g., 210, 212, 214, 216, 218, 252, 260, 428).

In block 514, starting at the UE beam switch slot, the processor may send a signal to the UE using the adjusted downlink transmission parameters. In some embodiments, the processor may send a PDSCH signal or message to the UE using the adjusted downlink transmission parameters. Means for performing functions of the operations in block 512 may include the processor (e.g., 210, 212, 214, 216, 218, 252, 260, 428) and the wireless transceiver (e.g., 266).

Figure 5B:
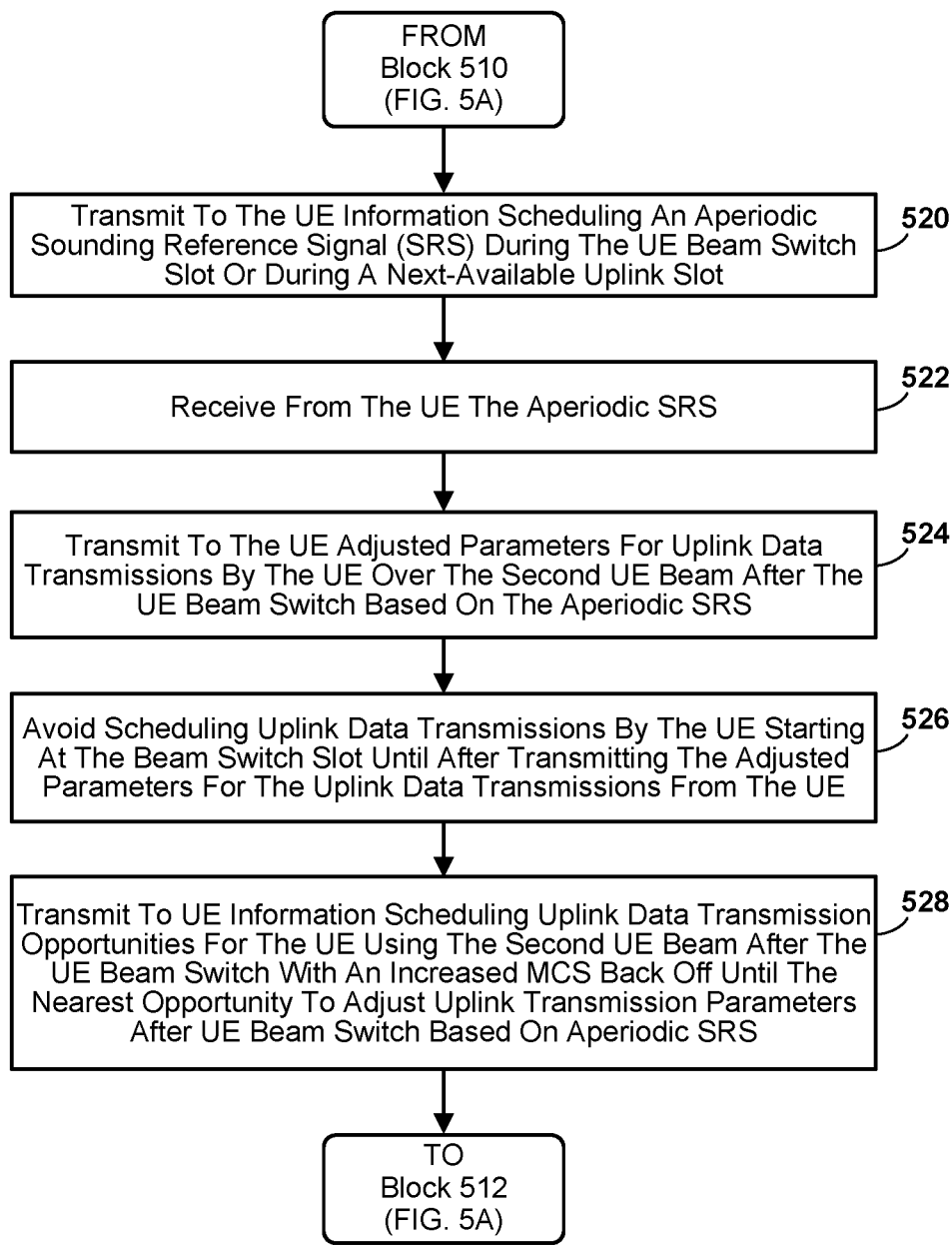
FIGS. 5B and 5C illustrate operations that may be performed as part of the method for UE beam reselection according to various embodiments.
Figure 5C:
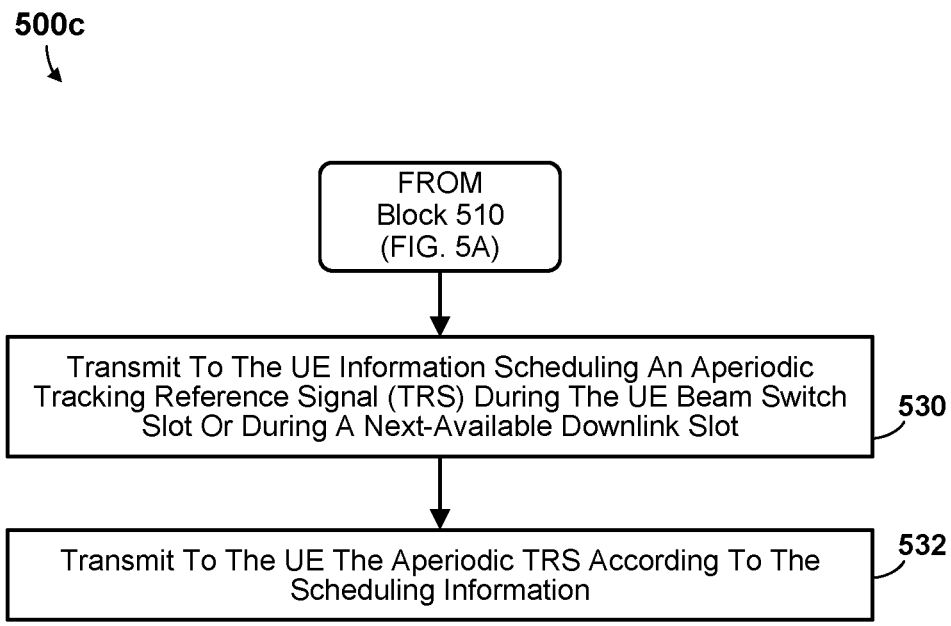

FIGS. 5B and 5C illustrate operations 500b and 500c that may be performed as part of the method 500a for UE beam reselection according to various embodiments. With reference to FIGS. 1-5C, the operations 500b and 500c may be performed by a processor (such as the processor 210, 212, 214, 216, 218, 252, 260, 428) of a base station (such as the base station 110a-110d, 200, 350, 402).

Referring to FIG. 5B, following the performance of the operations of block 510 (FIG. 5A), the processor may transmit to the UE information scheduling an aperiodic sounding reference signal (SRS) during the beam switch slot or during a next-available uplink slot in block 520. Means for performing functions of the operations in block 520 may include the processor (e.g., 210, 212, 214, 216, 218, 252, 260, 428) and the wireless transceiver (e.g., 266).

In block 522, the processor may receive from the UE the SRS. Means for performing functions of the operations in block 522 may include the processor (e.g., 210, 212, 214, 216, 218, 252, 260, 428) and the wireless transceiver (e.g., 266).

In block 524, the processor may transmit to the UE adjusted parameters for uplink data transmissions by the UE over the second UE beam after the UE beam switch based on the aperiodic SRS. In some embodiments, based on the received aperiodic SRS (e.g., based on processing of the SRS), the base station may configure precoding, a number of layers, and an MCS to be used by the UE for uplink transmissions. Means for performing functions of the operations in block 524 may include the processor (e.g., 210, 212, 214, 216, 218, 252, 260, 428).

In block 526, the processor may avoid scheduling uplink data transmissions from the UE starting at the UE beam switch slot until after transmitting the adjusted parameters for uplink data transmissions from the UE. Means for performing functions of the operations in block 526 may include the processor (e.g., 210, 212, 214, 216, 218, 252, 260, 428).

In block 528, the processor may transmit to the UE information scheduling/configuring uplink data transmission opportunities for the UE using the second UE beam with an increased modulation and coding scheme (MCS) back off until the nearest opportunity to adjust uplink transmission parameters after UE beam switch based on SRS measurements. Means for performing functions of the operations in block 528 may include the processor (e.g., 210, 212, 214, 216, 218, 252, 260, 428) and the wireless transceiver (e.g., 266).

The processor may then proceed to perform the operations of block 512 (FIG. 5A) as described.

Referring to FIG. 5C following the performance of the operations of block 510 (FIG. 5A), the processor may transmit to the UE information scheduling an aperiodic tracking reference signal (TRS) during the beam switch slot or during a next-available downlink slot to enable the UE to refine an estimation of channel characteristics of the channel associated with the serving beam obtained after the UE beam switch in block 530. Means for performing functions of the operations in block 530 may include the processor (e.g., 210, 212, 214, 216, 218, 252, 260, 428) and the wireless transceiver (e.g., 266).

In block 532, the processor may transmit to the UE the aperiodic TRS according to the scheduling information. Means for performing functions of the operations in block 532 may include the processor (e.g., 210, 212, 214, 216, 218, 252, 260, 428) and the wireless transceiver (e.g., 266).

In some embodiments, the operations of blocks 520 and 532 may be performed in parallel with the operations of blocks 512 and/or 514 (FIG. 5A). In various embodiments, the operations of blocks 520 and 532 may be performed before, during, or after the performance of the operations of blocks 512 and/or 514.

Figure 6:
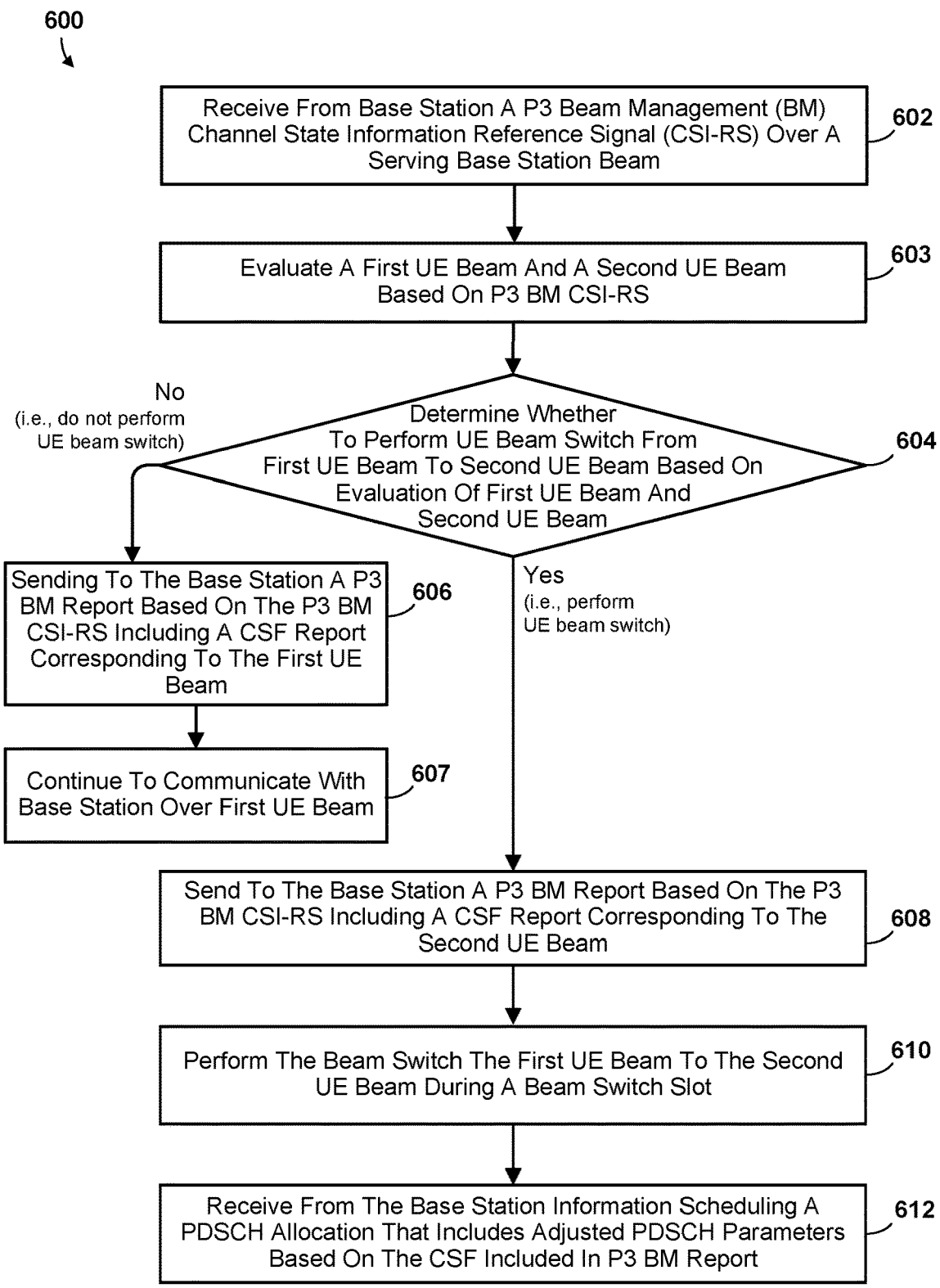
FIG. 6 is a process flow diagram illustrating a method 600 performed by a processor of a UE for UE beam reselection according to various embodiments.

FIG. 6 is a process flow diagram illustrating a method 600 performed by a processor of a UE for UE beam reselection according to various embodiments. With reference to FIGS. 1-6, the operations of the method 600 may be performed by a processor (such as the processor 210, 212, 214, 216, 218, 252, 260, 432) of a UE (such as the UE 120a-120f, 200, 320, 404).

In block 602, the processor may receive from a base station a P3 BM CSI-RS over a serving base station beam. In some embodiments, the processor (i.e., the UE) may receive from the base station a P3 BM CSI-RS that has been transmitted using two antenna ports. In some embodiments, the P3 BM CSI-RS may include a first OFDM symbol and a second OFDM symbol. In some embodiments, the P3 BM CSI-RS may be limited to a first OFDM symbol and a second OFDM symbol. In some embodiments, the processor may receive additional signals or data transmitted to the UE on the first OFDM symbol and multiplexed in a frequency domain with the P3 BM CSI-RS.

For example, the processor may receive data multiplexed with a first repetition of the P3 BM CSI-RS. In this example, good data reception with the current serving UE beam is highly likely (same as for all the previous recent transmissions to the UE). The processor may test or evaluate the second UE beam using the second OFDM symbol. The probability of good data reception on the second P3 BM CSI-RS repetition is unknown when the processor tests the second UE beam. Means for performing functions of the operations in block 602 may include the processor (e.g., 210, 212, 214, 216, 218, 252, 260, 432) and the wireless transceiver (e.g., 266).

In block 603, the processor may evaluate a first UE beam and a second UE beam based on the P3 BM CSI-RS. In some embodiments, the processor may determine one or more UE candidate beams to evaluate based on serving beam synchronization signal block (SSB) transmissions. In some embodiments, this may be aligned with a regular UE beam management procedure. In some embodiments, the processor may evaluate the first and second UE beams using criteria such as one or more SPEF metrics. In various embodiments, receiving a CSI-RS that was transmitted using two base station antenna ports may enable the UE to determine CSF for a selected UE beam (i.e., for the current UE beam or a newly-selected UE beam), as further described below. Means for performing functions of the operations in block 603 may include the processor (e.g., 210, 212, 214, 216, 218, 252, 260, 432).

In determination block 604, the processor may determine whether to perform a beam switch from a first UE beam to a second UE beam based on the evaluation of the first UE beam and the second UE beam. In some embodiments, the processor may evaluate a spectral efficiency of the first UE beam and a spectral efficiency of the second UE beam based on the P3 beam management CSI-RS having two transmitted using two base station antenna ports. In such embodiments, the processor may determine whether to perform the beam switch from a first UE beam to a second UE beam based on the evaluation of the spectral efficiency of the first UE beam and a spectral efficiency of the second UE beam. In this case, the UE may determine whether to perform the UE beam switch based on targeted spectral efficiency maximization criteria. As noted above, the processor may evaluate the first UE beam using the first OFDM symbol, and evaluate the second UE beam using the second OFDM symbol. In such embodiments, the processor may determine whether to perform a beam switch from a first UE beam to a second UE beam based on the evaluation of the first UE beam using the first OFDM symbol and second UE beam using the second OFDM symbol. Means for performing functions of the operations in determination block 604 may include the processor (e.g., 210, 212, 214, 216, 218, 252, 260, 432).

In response to determining not to perform the beam switch from the first UE beam to the second UE beam (i.e., determination block 604="No"), the processor may send to the base station a P3 BM report based on the P3 BM CSI-RS, which in this case includes a CSF report corresponding to the first UE beam (i.e., the current UE serving beam) in block 606. In some embodiments, this P3 BM report may not include an indication that the UE will perform the UE beam switch. In some embodiments, this P3 BM report may include an indication that the UE will not perform the UE beam switch. Means for performing functions of the operations in block 606 may include the processor (e.g., 210, 212, 214, 216, 218, 252, 260, 432) and the wireless transceiver (e.g., 266).

In block 607, the processor may continue communicating with the base station via the first UE beam. Means for performing functions of the operations in block 607 may include the processor (e.g., 210, 212, 214, 216, 218, 252, 260, 432) and the wireless transceiver (e.g., 266).

In response to determining to perform the beam switch from the first UE beam to the second UE beam (i.e., determination block 604="Yes"), the processor may send to the base station a P3 BM report that is based on the P3 BM CSI-RS, which in this case includes a CSF report corresponding to the second UE beam in block 608. In some embodiments, the P3 BM report may include the CSF report corresponding to the second UE beam and an indication that the UE will perform the beam switch from the first UE beam to the second UE beam. In some embodiments, the indication that the UE will perform the beam switch from the first UE beam to the second UE beam may include a single bit indication. Means for performing functions of the operations in block 608 may include the processor (e.g., 210, 212, 214, 216, 218, 252, 260, 432) and the wireless transceiver (e.g., 266).

In block 610, the processor may perform the beam switch from the first UE beam to the second UE beam during a beam switch slot. Means for performing functions of the operations in block 610 may include the processor (e.g., 210, 212, 214, 216, 218, 252, 260, 432) and the wireless transceiver (e.g., 266).

In block 612, the processor may receive from the base station information scheduling a PDSCH allocation that includes adjusted PDSCH parameters based on the CSF included in P3 BM report. In some embodiments, the instruction may include PDSCH allocation scheduling information with adjusted PDSCH parameters. Means for performing functions of the operations in block 612 may include the processor (e.g., 210, 212, 214, 216, 218, 252, 260, 432) and the wireless transceiver (e.g., 266).

Figure 7:
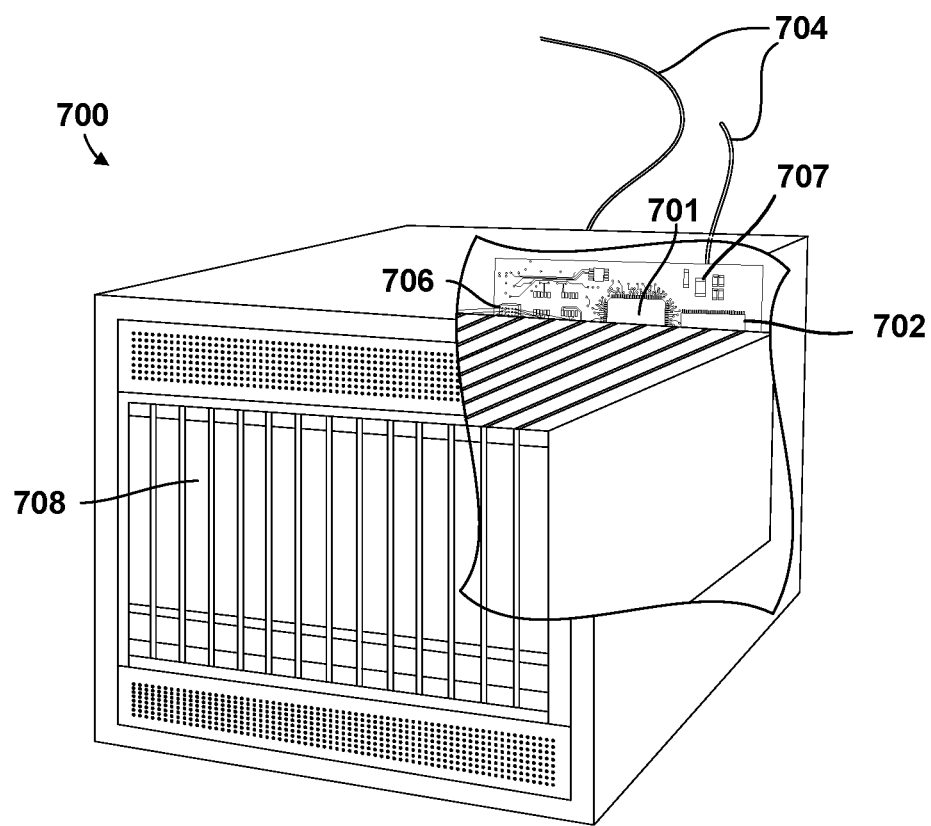
FIG. 7 is a component block diagram of a base station computing device suitable for use with various embodiments.

FIG. 7 is a component block diagram of a base station computing device suitable for use with various embodiments. Such base station computing devices (e.g., base station 110a-110d, 350, 402) may include at least the components illustrated in FIG. 7. With reference to FIGS. 1-7, the base station computing device 700 may typically include a processor 701 coupled to volatile memory 702 and a large capacity nonvolatile memory, such as a disk drive 708. The base station computing device 700 also may include a peripheral memory access device 706 such as a floppy disc drive, compact disc (CD) or digital video disc (DVD) drive coupled to the processor 701. The base station computing device 700 also may include network access ports 704 (or interfaces) coupled to the processor 701 for establishing data connections with a network, such as the Internet or a local area network coupled to other system computers and servers. The base station computing device 700 may include one or more antennas 707 for sending and receiving electromagnetic radiation that may be connected to a wireless communication link. The base station computing device 700 may include additional access ports, such as USB, Firewire, Thunderbolt, and the like for coupling to peripherals, external memory, or other devices.

Figure 8:
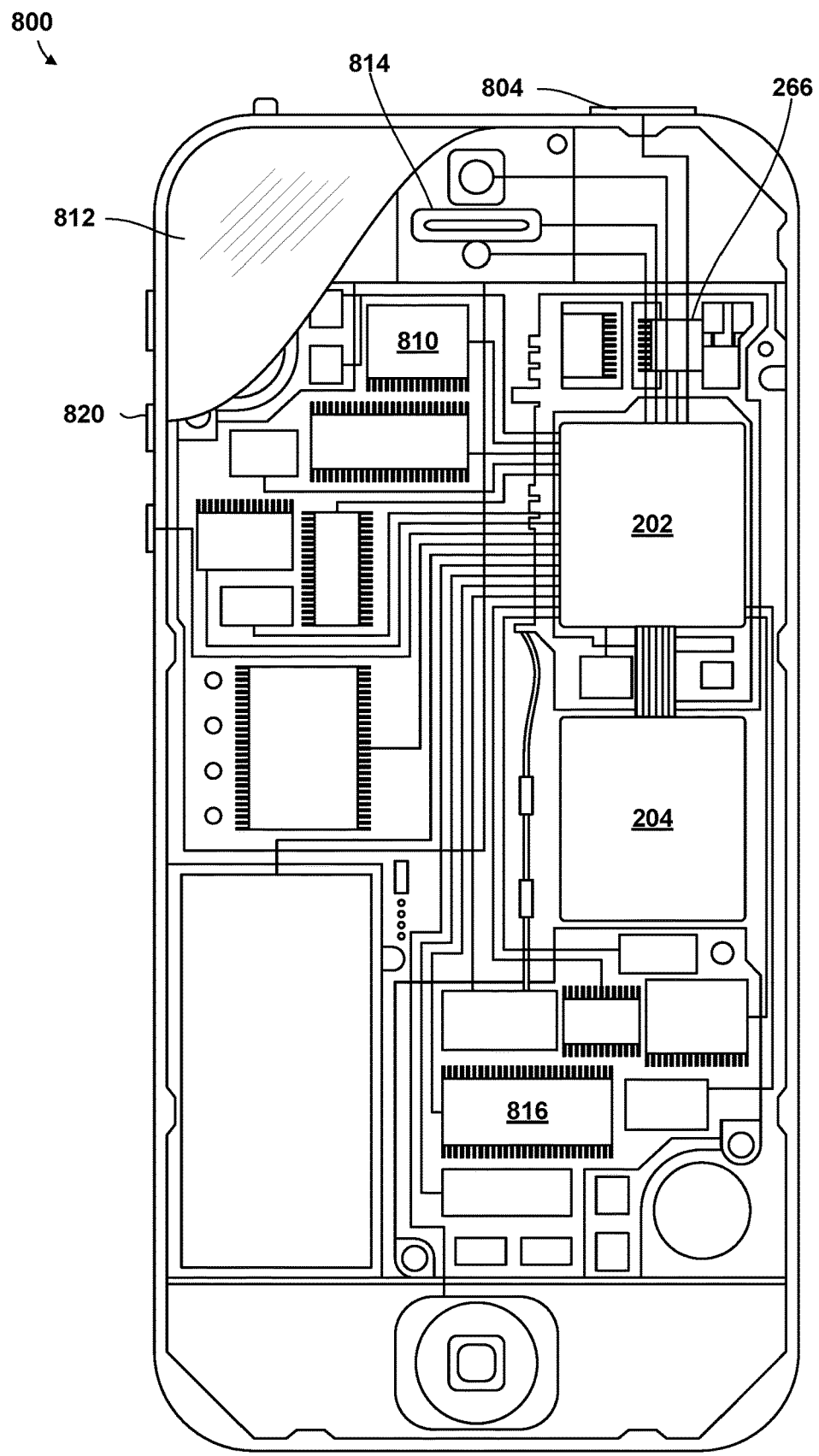
FIG. 8 is a component block diagram of a UE suitable for use with various embodiments.

FIG. 8 is a component block diagram of a UE 800 suitable for use with various embodiments. With reference to FIGS. 1-8, various embodiments may be implemented on a variety of UEs 800 (for example, the UE 120a-120e, 200, 320, 404), an example of which is illustrated in FIG. 8 in the form of a smartphone. The UE 800 may include a first SOC 202 (for example, a SOC-CPU) coupled to a second SOC 204 (for example, a 5G capable SOC). The first and second SOCs 202, 204 may be coupled to internal memory 816, a display 812, and to a speaker 814. Additionally, the UE 800 may include an antenna 804 for sending and receiving electromagnetic radiation that may be connected to a wireless transceiver 266 coupled to one or more processors in the first and/or second SOCs 202, 204. UE 800 may include menu selection buttons or rocker switches 820 for receiving user inputs.

The UE 800 UE 800 may include a sound encoding/decoding (CODEC) circuit 810, which digitizes sound received from a microphone into data packets suitable for wireless transmission and decodes received sound data packets to generate analog signals that are provided to the speaker to generate sound. One or more of the processors in the first and second SOCs 202, 204, wireless transceiver 266 and CODEC 810 may include a digital signal processor (DSP) circuit (not shown separately).

The processors of the base station computing device 700 and the UE 800 may be any programmable microprocessor, microcomputer or multiple processor chip or chips that can be configured by software instructions (applications) to perform a variety of functions, including the functions of some implementations described below. In some UEs, multiple processors may be provided, such as one processor within an SOC 204 dedicated to wireless communication functions and one processor within an SOC 202 dedicated to running other applications. Software applications may be stored in the memory 702, 816 before they are accessed and loaded into the processor. The processors may include internal memory sufficient to store the application software instructions.

Implementation examples are described in the following paragraphs. While some of the following implementation examples are described in terms of example methods, further example implementations may include: the example methods discussed in the following paragraphs implemented by a base station or a UE comprising a processor configured with processor-executable instructions to perform operations of the methods of the following implementation examples; the example methods discussed in the following paragraphs implemented by a base station or a UE comprising means for performing functions of the methods of the following implementation examples; and the example methods discussed in the following paragraphs may be implemented as a non-transitory processor-readable storage medium having stored thereon processor-executable instructions configured to cause a processor of a base station or a UE to perform the operations of the methods of the following implementation examples.

Example 1. A method performed by a processor of a base station for user equipment (UE) beam reselection, including: transmitting to a UE a P3 beam management (BM) channel state information reference signal (CSI-RS) over a serving base station beam; receiving from the UE a P3 BM report for the serving base station beam in response to the P3 BM CSI-RS; determining whether the P3 BM report includes an indication that the UE will perform a UE serving beam switch from a first UE beam to a second UE beam; determining a UE beam switch slot during which the UE will perform the beam switch in response to determining that the P3 BM report includes an indication that the UE will perform the UE serving beam switch from the first UE beam to a second UE beam; determining adjusted downlink transmission parameters based on channel state feedback (CSF) included in the P3 BM report; and starting at the UE beam switch slot, sending a physical downlink shared data channel (PDSCH) transmission to the UE using the adjusted downlink transmission parameters.

Example 2. The method of example 1, wherein the CSF included in the P3 BM report provides information about a channel associated with a beam pair of the serving base station beam and the second UE beam; and sending a signal to the UE using the adjusted downlink transmission parameters includes sending a signal to the UE using the adjusted downlink transmission parameters over the channel associated with the beam pair of the serving base station beam and the second UE beam.

Example 3. The method of any of examples 1 or 2, wherein the indication that the UE will perform a beam switch from a first UE beam to a second UE beam includes a single bit indication.

Example 4. The method of any of examples 1-3, wherein transmitting to the UE the P3 BM CSI-RS includes transmitting the P3 BM CSI-RS using two antenna ports.

Example 5. The method of any of examples 1-4, further including sending information to the UE scheduling a P3 beam management procedure based at least on two repetitions of a P3 BM CSI-RS resource transmitted on at least two OFDM symbols of a slot, wherein a repetition of the P3 BM CSI-RS resource is transmitted on a first orthogonal frequency division multiplexing (OFDM) symbol and a second repetition of the P3 BM CSI-RS resource is transmitted on a second OFDM symbol.

Example 6. The method of example 5, wherein the first OFDM symbol enables the UE to evaluate the first UE beam, and the second OFDM symbol enables the UE to evaluate the second UE beam.

Example 7. The method of any of examples 1-6, further including: transmitting to the UE information scheduling an aperiodic sounding reference signal (SRS) during the UE beam switch slot or during a next-available uplink slot; receiving the aperiodic SRS from the UE; and transmitting to the UE adjusted parameters for uplink data transmissions by the UE over the second UE beam after the UE beam switch based on the aperiodic SRS.

Example 8. The method of example 7, further including avoiding scheduling uplink data transmissions by the UE starting at the UE beam switch slot until after transmitting the adjusted parameters for uplink data transmissions from the UE.

Example 9. The method of either of examples 7 or 8, further including transmitting to the UE information scheduling uplink data transmission opportunities for the UE using the second UE beam after the UE beam switch with an increased modulation and coding scheme (MCS) back off until the nearest opportunity to adjust uplink transmission parameters after the UE beam switch based on SRS.

Example 10. The method of any of examples 1-9, further including: transmitting to the UE information scheduling an aperiodic tracking reference signal (TRS) during the UE beam switch slot or during a next-available downlink slot to enable the UE to refine an estimation of channel characteristics of the channel associated with the serving beam obtained after the UE beam switch; and transmitting to the UE the aperiodic TRS according to the scheduling information.

Example 11. The method of any of examples 1-10, wherein determining a UE beam switch slot during which the UE will perform the beam switch in response to determining that the P3 BM report includes an indication that the UE will perform the UE serving beam switch from the first UE beam to a second UE beam includes determining the UE beam switch slot based on a slot in which the base station receives the P3 BM report with the indication that the UE will perform a beam switch plus a slot offset.

Example 12. The method of any of examples 1-11, further including determining adjusted downlink transmission parameters for a channel associated with a beam pair of the serving base station beam and the first UE beam based on the CSF included in the P3 BM report in response to determining that the P3 BM report does not include an indication that the UE will perform the UE serving beam switch from the first UE beam to a second UE beam; and starting on a nearest downlink transmission occasion, sending a physical downlink shared data channel (PDSCH) transmission to the UE using the adjusting downlink transmission parameters.

Example 13. A method performed by a processor of a user equipment (UE) for UE beam reselection, including: receiving from a base station a P3 beam management (BM) channel state information reference signal (CSI-RS) over a serving base station beam; evaluating a first UE beam and a second UE beam based on the P3 BM CSI-RS; determining whether to perform a UE beam switch from the first UE beam to the second UE beam based on the evaluation of the first UE beam and the second UE beam; and in response to determining to perform the UE beam switch from the first UE beam to the second UE beam: sending to the base station a P3 BM report based on the P3 BM CSI-RS for the second UE beam, wherein the P3 BM report includes a channel state information feedback (CSF) report and an indication of whether the UE will perform a UE beam switch from the first UE beam to the second UE beam; performing the beam switch from the first UE beam to the second UE beam during a UE beam switch slot; and receiving from the base station control information to adjust data communication parameters based on the CSF report.

Example 14. The method of example 13, wherein the indication that the UE will perform the UE beam switch from a first UE beam to a second UE beam comprises a single bit indication.

Example 15. The method of any of examples 13 or 14, wherein: receiving from the base station the P3 BM CSI-RS includes receiving from the base station P3 BM CSI-RS resource repetitions, wherein each P3 BM CSI-RS resource repetition is transmitted using two antenna ports received from two base station antenna ports; evaluating a first UE beam and a second UE beam based on the P3 BM CSI-RS comprises evaluating a spectral efficiency associated with the first UE beam and a spectral efficiency associated with the second UE beam based on the P3 BM CSI-RS resource repetitions; and determining whether to perform a UE beam switch from the first UE beam to the second UE beam based on the evaluation of the first UE beam and the second UE beam comprises determining that the measured spectral efficiency corresponding to the second UE beam is higher than the measured spectral efficiency corresponding to the first UE beam.

Example 16. The method of any of examples 13-15, further including: receiving information from the base station scheduling a P3 beam management procedure based at least on two repetitions of a P3 BM CSI-RS resource transmitted on a first orthogonal frequency division multiplexing (OFDM) symbol and a second OFDM symbol; wherein evaluating a first UE beam and a second UE beam based on the P3 BM CSI-RS comprises: evaluating the first UE beam using the first OFDM symbol; and evaluating the second UE beam using the second OFDM symbol; and wherein determining whether to perform a UE beam switch from the first UE beam to the second UE beam based on the evaluation of the first UE beam and the second UE beam comprises determining whether to perform a beam switch from the first UE beam to the second UE beam based on the evaluation of the first UE beam using the first OFDM symbol and second UE beam using the second OFDM symbol.

Example 17. The method of any of examples 13-15, further including receiving from the base station data that is multiplexed with P3 BM CSI-RS resource on the first OFDM symbol.

Example 18. The method of any of examples 13-17, further including sending to the base station a P3 BM report that includes a CSF report evaluated based on the P3 BM CSI-RS for a channel associated with the first UE beam in response to determining not to perform the UE beam switch from the first UE beam to the second UE beam.

Example 19. The method of any of examples 13-18, further including sending to the base station a P3 BM report that includes a CSF report evaluated based on the P3 BM CSI-RS for a channel associated with the second UE beam in response to determining to perform the UE beam switch from the first UE beam to the second UE beam.

As used in this application, the tell is "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a UE and the UE may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G) as well as later generation 3GPP technology, GSM, universal mobile telecommunications system (UMTS), 3GSM, general packet radio service (GPRS), CDMA systems (e.g., cdmaOne, CDMA1020TM), EDGE, advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the methods and operations 500a, 500b, 500c, and 600 may be substituted for or combined with one or more operations of the methods and operations 500a, 500b, 500c, and 600.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a base station for user equipment (UE) beam reselection, comprising:
    transmitting to a UE a P3 beam management (BM) channel state information reference signal (CSI-RS) over a serving base station beam;
    receiving from the UE a P3 BM report for the serving base station beam in response to the P3 BM CSI-RS;
    determining whether the P3 BM report includes an indication that the UE will perform a UE serving beam switch from a first UE beam to a second UE beam;
    determining a UE beam switch slot during which the UE will perform the beam switch in response to determining that the P3 BM report includes an indication that the UE will perform the UE serving beam switch from the first UE beam to a second UE beam;
    determining adjusted downlink transmission parameters based on channel state feedback (CSF) included in the P3 BM report, wherein the CSF included in the P3 BM report provides information about a channel associated with a beam pair of the serving base station beam and the second UE beam; and
    starting at the UE beam switch slot, sending a physical downlink shared data channel (PDSCH) transmission to the UE using the adjusted downlink transmission parameters over the channel associated with the beam pair of the serving base station beam and the second UE beam.

2. The method of claim 1, wherein the indication that the UE will perform a beam switch from a first UE beam to a second UE beam comprises a single bit indication.

3. The method of claim 1, wherein transmitting to the UE the P3 BM CSI-RS comprises transmitting the P3 BM CSI-RS using two antenna ports.

4. The method of claim 1, further comprising sending information to the UE scheduling a P3 beam management procedure based at least on two repetitions of a P3 BM CSI-RS resource transmitted on at least two OFDM symbols of a slot, wherein a repetition of the P3 BM CSI-RS resource is transmitted on a first orthogonal frequency division multiplexing (OFDM) symbol and a second repetition of the P3 BM CSI-RS resource is transmitted on a second OFDM symbol.

5. The method of claim 4, wherein the first OFDM symbol enables the UE to evaluate the first UE beam, and the second OFDM symbol enables the UE to evaluate the second UE beam.

6. The method of claim 1, further comprising:
transmitting to the UE information scheduling an aperiodic sounding reference signal (SRS) during the UE beam switch slot or during a next-available uplink slot;
receiving the aperiodic SRS from the UE; and
transmitting to the UE adjusted parameters for uplink data transmissions by the UE over the second UE beam after the UE beam switch based on the aperiodic SRS.

7. The method of claim 6, further comprising avoiding scheduling uplink data transmissions by the UE starting at the UE beam switch slot until after transmitting the adjusted parameters for uplink data transmissions from the UE.

8. The method of claim 6, further comprising transmitting to the UE information scheduling uplink data transmission opportunities for the UE after the UE beam switch with an increased modulation and coding scheme (MCS) back off until a nearest opportunity to adjust uplink transmission parameters after the UE beam switch based on SRS.

9. The method of claim 1, further comprising:
transmitting to the UE information scheduling an aperiodic tracking reference signal (TRS) during the UE beam switch slot or during a next-available downlink slot to enable the UE to refine an estimation of channel characteristics of the channel associated with the serving beam obtained after the UE beam switch; and
transmitting to the UE the aperiodic TRS according to the scheduling information.

10. The method of claim 1, wherein determining a UE beam switch slot during which the UE will perform the beam switch in response to determining that the P3 BM report includes an indication that the UE will perform the UE serving beam switch from the first UE beam to a second UE beam comprises determining the UE beam switch slot based on a slot in which the base station receives the P3 BM report with the indication that the UE will perform a beam switch plus a relative slot offset.

11. The method of claim 1, further comprising determining adjusted downlink transmission parameters for a channel associated with a beam pair of the serving base station beam and the first UE beam based on the CSF included in the P3 BM report in response to determining that the P3 BM report does not include an indication that the UE will perform the UE serving beam switch from the first UE beam to a second UE beam; and
starting on a nearest downlink transmission occasion, sending a physical downlink shared data channel (PDSCH) transmission to the UE using the adjusting downlink transmission parameters.

12. A method performed by a processor of a user equipment (UE) for UE beam reselection, comprising:
receiving from a base station a P3 beam management (BM) channel state information reference signal (CSI-RS) transmitted over a serving base station beam including repetitions of a P3 BM CSI-RS resource transmitted on a first orthogonal frequency division multiplexing (OFDM) symbol and a second OFDM symbol, and another signal that is multiplexed with the P3 BM CSI-RS resource on the first OFDM symbol;
evaluating a first UE beam using the first OFDM symbol and a second UE beam using the second OFDM symbol based on the P3 BM CSI-RS;
determining whether to perform a UE beam switch from the first UE beam to the second UE beam based on the evaluation of the first UE beam using the first OFDM symbol and the second UE beam using the second OFDM symbol;
sending to the base station a P3 BM report based on the P3 BM CSI-RS, wherein the P3 BM report includes a channel state information feedback (CSF) report corresponding to the first or the second selected UE beam and an indication of whether the UE will perform a UE beam switch from the first UE beam to the second UE beam; and
in response to determining to perform the UE beam switch from the first UE beam to the second UE beam:
performing the beam switch from the first UE beam to the second UE beam during a UE beam switch slot; and
receiving from the base station information scheduling a PDSCH allocation that includes adjusted PDSCH parameters based on the CSF included in P3 BM report.

13. The method of claim 12, wherein the indication that the UE will perform the UE beam switch from a first UE beam to a second UE beam comprises a single bit indication.

14. The method of claim 12, wherein:
receiving from the base station the P3 BM CSI-RS comprises receiving from the base station P3 BM CSI-RS resource repetitions, wherein each P3 BM CSI-RS resource repetition is transmitted using two antenna ports;
evaluating a first UE beam and a second UE beam based on the P3 BM CSI-RS comprises evaluating a spectral efficiency associated with the first UE beam and a spectral efficiency associated with the second UE beam based on the P3 BM CSI-RS resource repetitions; and
determining whether to perform a UE beam switch from the first UE beam to the second UE beam based on the evaluation of the first UE beam and the second UE beam comprises determining that the measured spectral efficiency corresponding to the second UE beam is higher than the measured spectral efficiency corresponding to the first UE beam.

15. The method of claim 12, further comprising sending to the base station a P3 BM report that includes a CSF report evaluated based on the P3 BM CSI-RS for a channel associated with the first UE beam in response to determining not to perform the UE beam switch from the first UE beam to the second UE beam.

16. The method of claim 12, further comprising sending to the base station a P3 BM report that includes a CSF report evaluated based on the P3 BM CSI-RS for a channel associated with the second UE beam in response to determining to perform the UE beam switch from the first UE beam to the second UE beam.

17. A base station, comprising:
a processor configured with processor executable instructions to perform operations comprising:
transmitting to a UE a P3 beam management (BM) channel state information reference signal (CSI-RS) over a serving base station beam;
receiving from the UE a P3 BM report for the serving base station beam in response to the P3 BM CSI-RS;

determining whether the P3 BM report includes an indication that the UE will perform a UE serving beam switch from a first UE beam to a second UE beam;

determining a UE beam switch slot during which the UE will perform the beam switch in response to determining that the P3 BM report includes an indication that the UE will perform the UE serving beam switch from the first UE beam to a second UE beam;

determining adjusted downlink transmission parameters based on channel state feedback (CSF) included in the P3 BM report, wherein the CSF included in the P3 BM report provides information about a channel associated with a beam pair of the serving base station beam and the second UE beam; and starting at the UE beam switch slot, sending a physical downlink shared data channel (PDSCH) transmission to the UE using the adjusted downlink transmission parameters over the channel associated with the beam pair of the serving base station beam and the second UE beam.

18. The base station of claim 17, wherein the processor is further configured with processor executable instructions to perform operations such that the indication that the UE will perform a beam switch from a first UE beam to a second UE beam comprises a single bit indication.

19. The base station of claim 17, wherein the processor is further configured with processor executable instructions to perform operations such that transmitting to the UE the P3 BM CSI-RS comprises transmitting the P3 BM CSI-RS using two antenna ports.

20. The base station of claim 17, wherein the processor is configured with processor executable instructions to perform operations further comprising sending information to the UE scheduling a P3 beam management procedure based at least on two repetitions of a P3 BM CSI-RS resource transmitted on at least two OFDM symbols of a slot, wherein the a repetition of the P3 BM CSI-RS resource is transmitted on a first orthogonal frequency division multiplexing (OFDM) symbol and a second repetition of the P3 BM CSI-RS resource is transmitted on a second OFDM symbol.

21. The base station of claim 20, wherein the processor is further configured with processor executable instructions to perform operations such that the first OFDM symbol enables the UE to evaluate the first UE beam, and the second OFDM symbol enables the UE to evaluate the second UE beam.

22. The base station of claim 17, wherein the processor is configured with processor executable instructions to perform operations further comprising:

transmitting to the UE information scheduling an aperiodic sounding reference signal (SRS) during the UE beam switch slot or during a next-available uplink slot;

receiving the aperiodic SRS from the UE; and transmitting to the UE adjusted parameters for uplink data transmissions by the UE over the second UE beam after the UE beam switch based on the aperiodic SRS.

23. The base station of claim 22, wherein the processor is configured with processor executable instructions to perform operations further comprising avoiding scheduling uplink data transmissions by the UE starting at the UE beam switch slot until after transmitting the adjusted parameters for uplink data transmissions from the UE.

24. The base station of claim 22, wherein the processor is configured with processor executable instructions to perform operations further comprising transmitting to the UE information scheduling uplink data transmission opportunities for the UE using the second UE beam after the UE beam switch with an increased modulation and coding scheme (MCS) back off until a nearest opportunity to adjust uplink transmission parameters after the UE beam switch based on SRS.

25. The base station of claim 17, wherein the processor is configured with processor executable instructions to perform operations further comprising:

transmitting to the UE information scheduling an aperiodic tracking reference signal (TRS) during the UE beam switch slot or during a next-available downlink slot to enable the UE to refine an estimation of channel characteristics of the channel associated with the serving beam obtained after the UE beam switch; and transmitting to the UE the aperiodic TRS according to the scheduling information.

26. A user equipment (UE), comprising:

a processor configured with processor executable instructions to perform operations comprising:

receiving from a base station a P3 beam management (BM) channel state information reference signal (CSI-RS) over a serving base station beam including repetitions of a P3 BM CSI-RS resource transmitted on a first orthogonal frequency division multiplexing (OFDM) symbol and a second OFDM symbol, and another signal that is multiplexed with the P3 BM CSI-RS resource on the first OFDM symbol;

evaluating a first UE beam using the first OFDM symbol and a second UE beam using the second OFDM symbol based on the P3 BM CSI-RS;

determining whether to perform a UE beam switch from the first UE beam to the second UE beam based on the evaluation of the first UE beam using the first OFDM symbol and the second UE beam using the second OFDM symbol;

sending to the base station a P3 BM report based on the P3 BM CSI-RS, wherein the P3 BM report includes a channel state information feedback (CSF) report corresponding to the first or the second selected UE beam and an indication of whether the UE will perform a UE beam switch from the first UE beam to the second UE beam; and in response to determining to perform the UE beam switch from the first UE beam to the second UE beam:

performing the beam switch from the first UE beam to the second UE beam during a UE beam switch slot; and receiving from the base station information scheduling a PDSCH allocation that includes adjusted PDSCH parameters based on the CSF included in P3 BM report.

* * * * *